United States Patent [19]

Steenackers et al.

[11] Patent Number: 5,593,645

[45] Date of Patent: Jan. 14, 1997

[54] CATALYTIC CONVERTER FOR THE CATALYTIC TREATMENT OF EXHAUST GAS

[75] Inventors: Pieter D. Steenackers, Heverlee; Frédéric P. D. F. Petitjean, Jupille-sur-Meuse, both of Belgium

[73] Assignee: Scambia Industrial Developments Aktiengesellschaft, Liechtenstein

[21] Appl. No.: 420,177

[22] Filed: Apr. 11, 1995

[30] Foreign Application Priority Data

Apr. 11, 1994 [CH] Switzerland .............. 1065/94

[51] Int. Cl.$^6$ .............. F01N 3/10; B01D 53/92
[52] U.S. Cl. .......... 422/176; 422/180; 422/181; 60/299
[58] Field of Search .............. 422/176, 177, 422/180, 181, 218; 60/299

[56] References Cited

U.S. PATENT DOCUMENTS

| | | | |
|---|---|---|---|
| 3,594,131 | 7/1971 | De Palma et al. | 422/181 |
| 3,649,213 | 3/1972 | De Palma et al. | 422/176 |
| 3,925,252 | 12/1975 | Yabuta et al. | 422/177 |
| 4,196,170 | 4/1980 | Cemenska | 422/181 |
| 4,385,032 | 5/1983 | Fratzer et al. | 422/181 |
| 4,987,034 | 1/1991 | Hitachi et al. | 422/180 |
| 5,108,717 | 4/1992 | Deller et al. | 422/181 |

FOREIGN PATENT DOCUMENTS

| | | |
|---|---|---|
| 0514326 | 5/1991 | European Pat. Off. . |
| 2138266 | 5/1971 | France . |
| 2617903 | 7/1987 | France . |
| 4311513 | 4/1992 | Germany . |
| 56-000429 | 9/1981 | Japan . |
| 2062487 | 11/1980 | United Kingdom . |
| 2074888 | 3/1981 | United Kingdom . |

OTHER PUBLICATIONS

Article from Engineering (1993) Nov. No. 10, London, "Catalytic Converters, Engineering", vol. 223, pp.7, 9.

Primary Examiner—Robert J. Warden
Assistant Examiner—Theresa T. Snider
Attorney, Agent, or Firm—Anderson, Kill & Olick P.C.

[57] ABSTRACT

The catalytic converter for the catalytic treatment of exhaust gas has a housing, an inlet and an outlet. The housing contains catalyst means having at least two packets of sheet metal members. The inlet leads into an inner cavity located between the packets and has, at its orifice, the same cross-sectional shape and the same cross-sectional dimensions as the inner cavity. The latter has at least one free region whose cross-sectional area decreases in a direction away from the inlet. The outlet is connected to an outer cavity located between inner surface sections of the housing and the catalyst means. Each packet of sheet metal members bounds passages which in cross-section run from the inner cavity to the outer cavity on different sides. This makes it possible to adapt the shape of the housing well to the available space. In addition, the catalytic converter has advantageous flow and cold-start characteristics and can be economically produced.

38 Claims, 8 Drawing Sheets

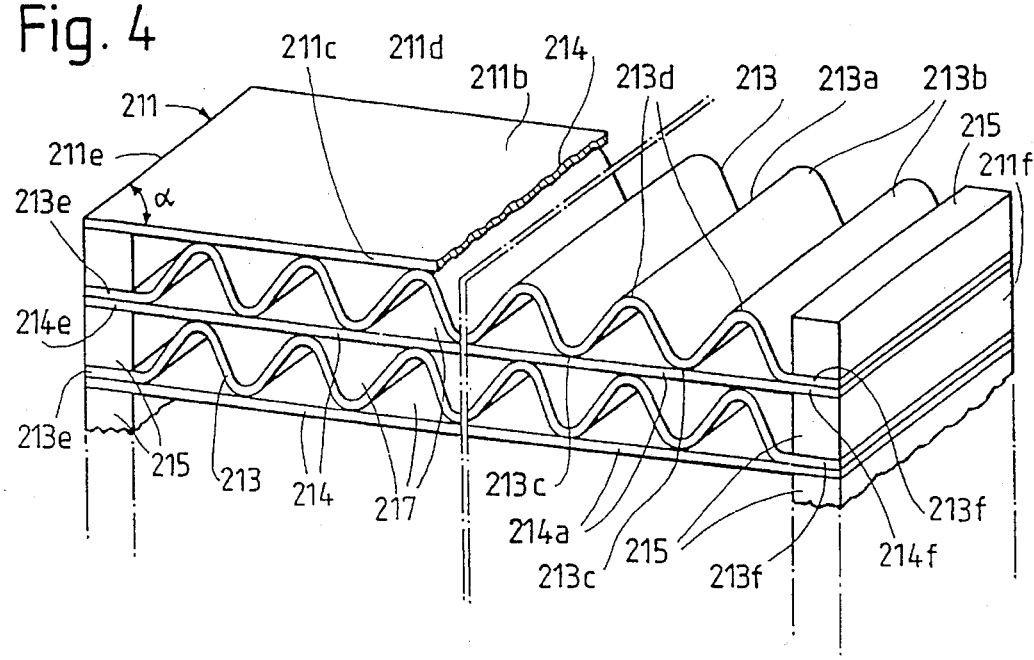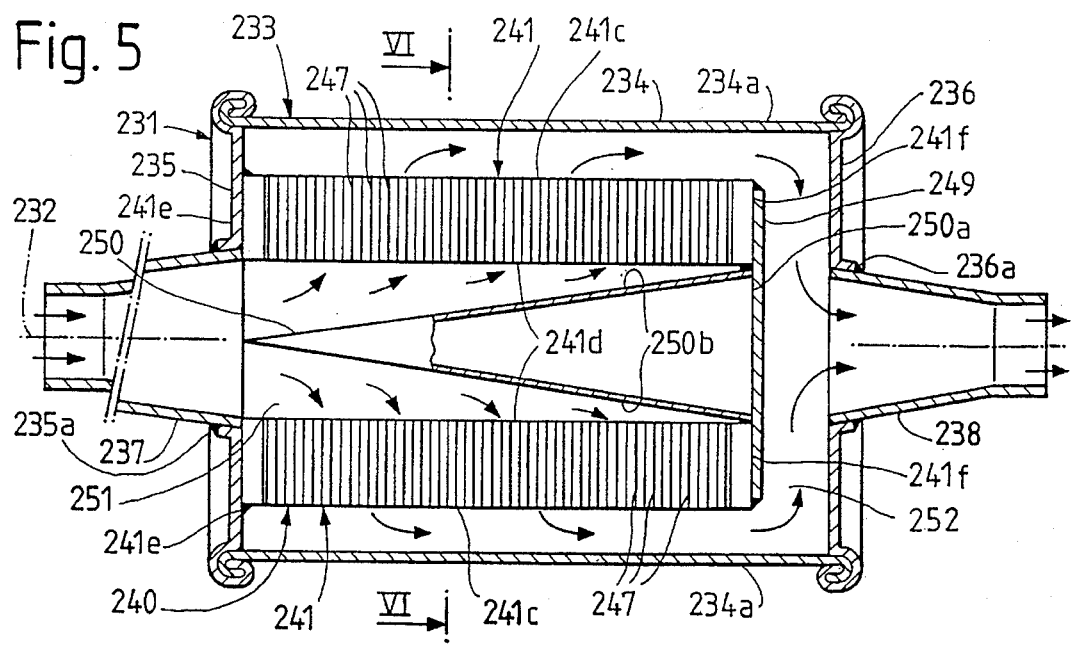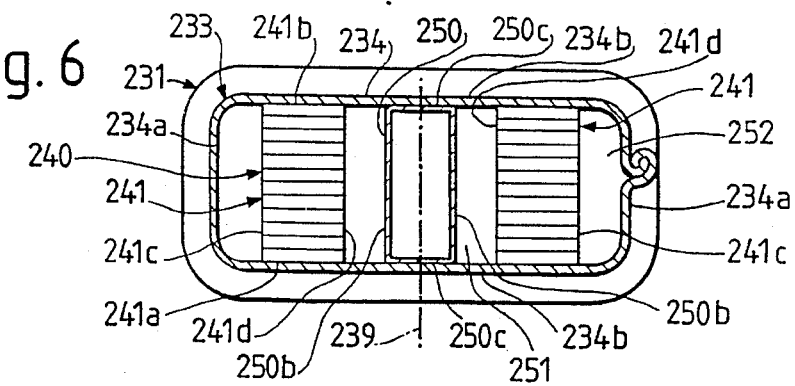

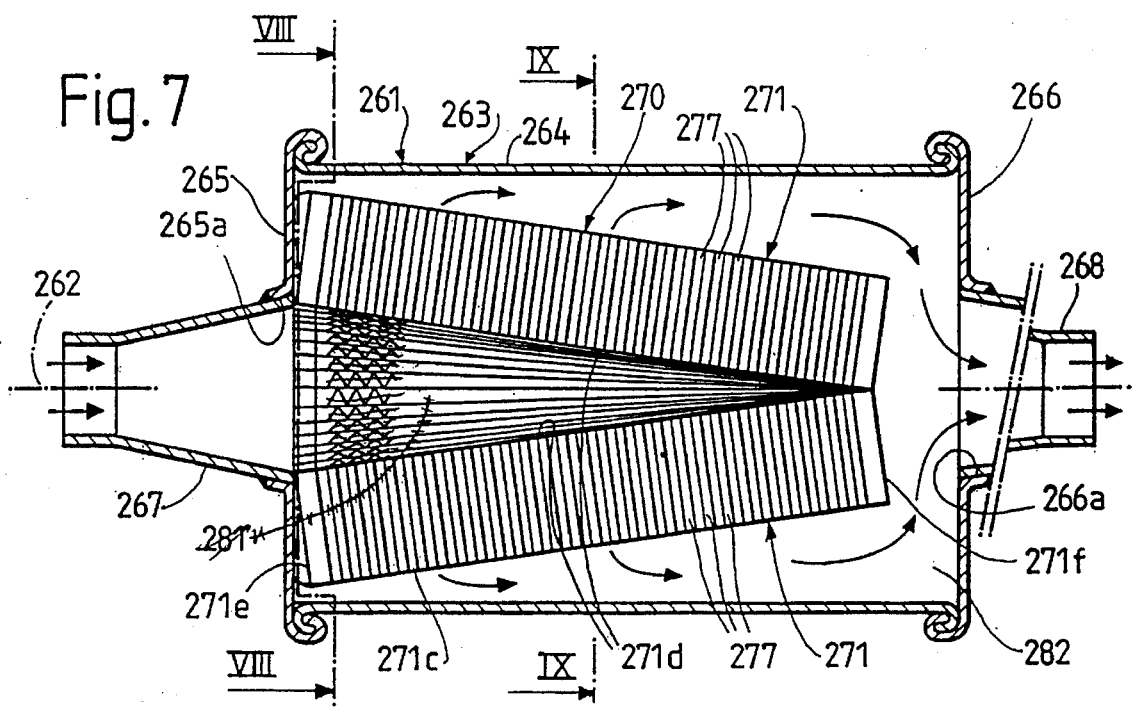
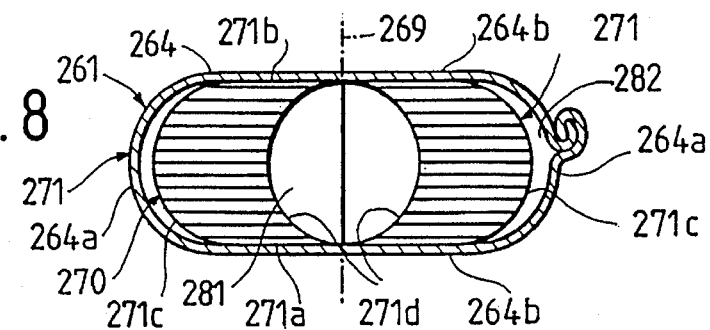
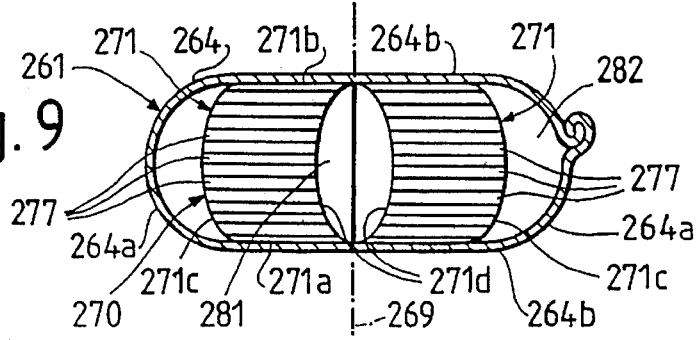
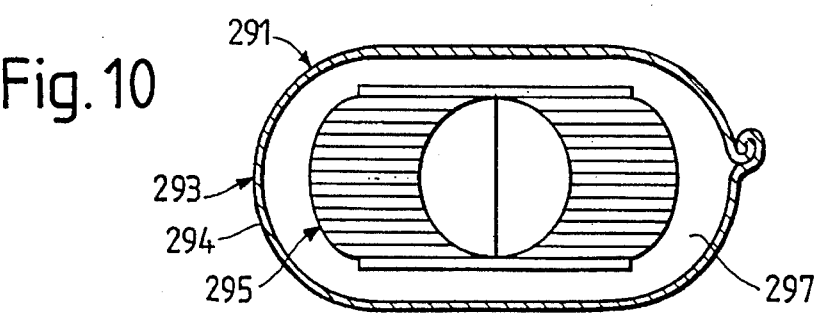

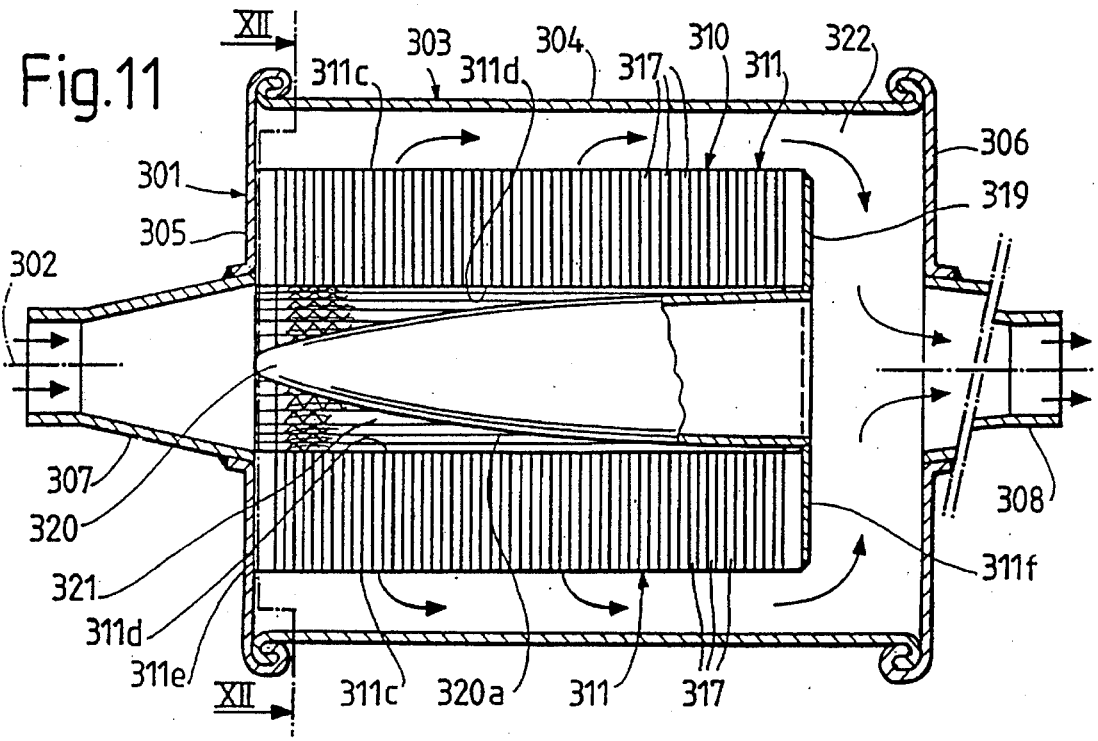
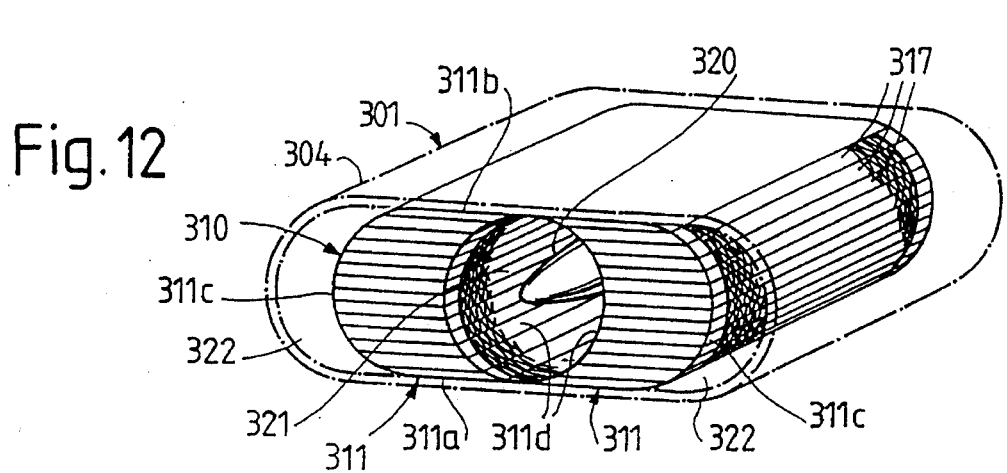

CATALYTIC CONVERTER FOR THE CATALYTIC TREATMENT OF EXHAUST GAS

BACKGROUND OF THE INVENTION

1. Field of the Invention

The invention relates to a catalytic converter for the catalytic treatment of exhaust gas.

The catalytic converter is provided in particular to purify and/or to detoxify exhaust gas produced by a gasoline combustion engine of a motor vehicle, for example of an automobile, or possibly by another internal combustion engine, by means of a catalytic treatment, i.e. to free said exhaust gas from pollutants by converting them by a chemical reaction.

2. Description of the Prior Art

Known catalytic converters for the treatment of exhaust gas have a housing with an inlet and an outlet. The housing contains catalyst means having a catalyst support, frequently referred to as a substrate, with passages for the exhaust gas, or having a plurality of catalyst supports through which exhaust gas flows in succession during operation. The surfaces bounding the passages are provided with a coating which has a catalytically active material containing at least one noble metal.

Many of these known catalytic converters have the disadvantage that the exhaust gas flowing in through the inlet is distributed only over a small exhaust gas entry surface of the (first) catalyst support and/or only nonuniformly over this exhaust gas entry surface and/or that, between the inlet and the (first) catalyst support and/or in the latter, even at the beginning of operation, the exhaust gas relatively rapidly releases a large quantity of heat via the wall of the housing to the environment. If the exhaust gas is distributed only over a small exhaust gas entry surface and/or irregularly over such a surface, this increases the pressure drop or opposite pressure and furthermore causes a reduction in the efficiency and hence an increase in the required volume of the catalyst support, in the required noble metal and in the production costs. During a cold start of the internal combustion engine and catalytic converter, rapid release of a large quantity of heat by the catalytic converter means that it takes a relatively long time until the or each catalyst support reaches the temperature required for efficient exhaust gas treatment.

European Patent Disclosure 0 514 326 discloses various catalytic converters which already substantially avoid the disadvantages described above. This publication discloses, for example, catalytic converters having a housing which has a casing and catalyst means with an annular catalyst support. This consists of a packet of annular sheet metal members. The successive sheet metal members have intersecting waves. The sheet metal members are held together by retaining means. These have bolts which pass through holes in the sheet metal members and are welded at their ends to a flat plate or housing wall. An opening in the housing is connected to an inner cavity enclosed by an inner lateral surface of the catalyst support. Another opening in the housing is connected to an outer cavity present between the casing of the housing and an outer lateral surface of the catalyst support. The catalyst support has passages which run from the inner to the outer cavity and are distributed uniformly along the circumference of the outer lateral surface. The casings of the housings and the lateral surfaces of the catalyst supports of these known catalytic converters are circular or oval in cross-section and have cross-sectional dimension which are substantially larger than the axial dimensions of the casings or catalyst supports.

The annular sheet metal members of these known catalytic converters are usually produced by punching them out of quadrilateral metal sheets or out of metal strips. This gives rise to a relatively large amount of sheet metal waste, which makes the production of the catalytic converters more expensive.

There is often only a small amount of space available when catalytic converters are to be installed underneath an automobile. The space available may vary from one type of automobile to another. To permit short exhaust gas pipes, it may be desirable, for example in certain cases, for the casing to have a relatively flat cross-section and hence for a cross-sectional dimension of the casing to be relatively small compared with the amount of exhaust gas to be treated. In other cases, it might be advantageous if the casing were approximately triangular in cross-section. Furthermore, it is advantageous in certain cases if the (maximum) cross-sectional dimension of the casing is smaller than its length.

In the known catalytic converters, whose catalyst means or catalyst supports have sheet metal members and passages running from an inner to an outer cavity, the cross-sectional area of the passages increases from the inside to the outside. This may increase the amount of catalytically active noble metal required and hence the production costs.

A catalytic converter disclosed in French Patent Disclosure 2 617 903 has a housing which contains catalyst means having a packet of annular sheet metal members which have coatings containing catalytically active material. The inlet of the catalytic converter leads into a cylindrical inner cavity enclosed by the catalyst means. An outer cavity which is connected to the outlet of the catalytic converter is present between the inner surface of the housing and the catalyst means. The sheet metal members of the catalyst means are in general conical, but at least one sheet metal member of each pair of adjacent sheet metal members is provided with waves or bulges so that the sheet metal members together in pairs bound passages running from the inner cavity to the outer cavity. The sheet metal members are arranged in a cage which has an annular flange at the inlet end of the packet and, at the other end, a plate and some rods which are connected to said plate and to the annular flange and are distributed around the packet.

The length of the inner cavity of this known catalytic converter is substantially larger than its diameter. The gas flowing through the inlet into the inner cavity during operation therefore forms a jet which is deflected only on striking the plate. The flow density of the exhaust gas flowing through the passages of the catalyst means is therefore substantially lower in the vicinity of this inlet than in the vicinity of that end of the catalyst means which is opposite to the inlet. Such inhomogeneous flow through the catalyst means results in poor utilization of the catalytically active material so that the catalytic converter becomes larger and more expensive than it would have been in the case of homogeneous flow through the catalyst means. In addition, turbulence occurs in the inner cavity, increasing the pressure drop of the exhaust gas flowing through the catalytic converter. There is also a great deal of waste in the production of the conical sheet metal members from metal sheets or metal strips. Furthermore, it is expensive to form conical sheet metal members having waves or bulges. According to the application last cited, the sheet metal members can be connected to one another or to the annular flange or to the plate by spot welding. Since the sheet metal members are in contact at least partly only in the case of linear wave summits or point-like bulge peaks and furthermore have coatings, it would however be very difficult and expensive to weld all sheet metal members to one another in pairs. Moreover, in spite of such spot-type connections, the sheet metal members can still experience relatively strong deformation and move relative to one another. Since the sheet metal members are subjected to vibrations, other accelerations and temperature change during the use of the catalytic converter, there is a great danger that the sheet metal members and especially their coatings will be damaged.

A catalytic converter disclosed in French Patent Disclosure 2 075 691, which corresponds to U.S. Pat. No. 3,649,213, has a housing possessing an oval cross-section and having an inlet and an outlet. A V-shaped catalyst support arranged in the housing has two hollow limbs which are bounded on the inside by perforated inner walls and on the outside by perforated outer walls and contain a particulate material used for the catalytic treatment of the exhaust gas. The inlet leads into an inner cavity present between the perforated inner walls of the catalyst support. An outer cavity present between the perforated outer walls of the catalyst support and the inner surface sections of the housing is connected to the outlet.

The particles of the particulate material are not described in more detail in the last-cited publication but presumably consist of a ceramic core which is coated with catalytically active material. If a catalytic converter is connected to an internal combustion engine of an automobile, vibrations produced by the engine when the automobile is operated act on the catalytic converter. The particles of the particulate material are therefore agitated, and they impact against one another and against the walls of the catalyst support and also slide over one another and over the walls. The particulate material is therefore destroyed in a short time due to abrasion and fracture during the use of the catalytic converter.

The diameter of the mouth of the inlet of the catalytic converter disclosed in the last-cited publication, which mouth leads into the inner cavity, is substantially smaller than the length of the inner cavity and than the width of that section of the inner cavity which is connected to the mouth of the inlet. When the catalytic converter is used, a large part of the gas flowing at high speed from the inlet into the inner cavity therefore forms a relatively thin jet which strikes the perforated inner surface of the catalyst support only at a large axial distance away from the inlet. Considerable turbulence is produced in those regions of the inner cavity which are located to the side of the mouth of the inlet. The flow density of the exhaust gas in the catalyst support is therefore very inhomogeneous. This results in poor utilization of the catalytically active material and a large pressure drop or opposite pressure. The turbulences resulting in the inner cavity additionally increase the pressure drop or opposite pressure.

SUMMARY OF THE INVENTION

It is the object of the invention to provide a catalytic converter which eliminates the disadvantages of the known catalytic converters and in which in particular the shapes and the dimensions of the housing and of the catalyst means can be readily adapted to the available space, the catalytic converter permitting a uniform distribution of the exhaust gas over all passages of the catalyst means, small pressure losses, good starting characteristics, stable connection of the sheet metal members and economical production even with relatively large, axial dimensions of the catalyst means and of the inner cavity.

This object is achieved, according to the invention, by a catalytic converter for the catalytic treatment of exhaust gas, having a housing and catalyst means arranged therein, an inner cavity located at least partly between regions of the catalyst means and an outer cavity located between the catalyst means and at least a part of the housing being present, the catalyst means having sheet metal members which bound passages leading from the inner cavity to the outer cavity, and at least one sheet metal member of each pair of adjacent sheet metal members having protuberances, wherein the catalyst means have at least two packets of sheet metal members, wherein the sheet metal members belonging to the same packet define parallel osculating planes which mold to said members, and wherein the passages bounded by the various packets run away from the inner cavity on different sides of this cavity.

Those ends of the passages which lead into the inner or outer cavity are also referred to below as inner or outer ends of the passages.

According to the invention, the catalyst means have at least two packets of sheet metal members. Each of these packets of sheet metal members bounds a group of passages. At least at the outer ends of the passages, the various packets and the various groups of passages can then be a distance away from one another which is substantially greater than the distance between adjacent sheet metal members belonging to the same packet and than the distance between adjacent passages present in one and the same packet of sheet metal members.

According to the invention, one sheet metal member of each pair of directly adjacent sheet metal members is provided with protuberances. The other sheet metal member of each pair of adjacent sheet metal members may then be flat. Each packet of sheet metal members then consists of alternating first and second sheet metal members, the first sheet metal members having protuberances and the second sheet metal members being essentially flat.

The protuberances of a sheet metal member consist, for example, of straight waves parallel to one another or of bulges which preferable project on both sides of a central plane and, in a plan view of the sheet metal member, preferably have a roundish, for example circular, contour.

However, it is also possible to provide all sheet metal members with protuberances, for example waves. In this case, the waves of the successive sheet metal members may, for example, intersect.

Each sheet metal member defines two osculating planes or flat osculating surfaces, each of which molds to one of the two surfaces of the sheet metal member. If a sheet metal member has protuberances, the osculating planes mold to the highest points of the protuberances, for example to the summit lines of the waves or to the peaks of the bulges. If a sheet metal member is flat, the osculating planes defined by it are identical to the two flat surfaces of the sheet metal member.

The successive sheet metal members of a packet of sheet metal members can then rest against one another in pairs at osculating planes. With the exception of the osculating planes located at the two ends of a packet, the osculating planes then also form contact planes at which the adjacent sheet metal members make contact locally.

The formation of the catalyst means from at least two packets of sheet metal members permits good adaptation of the shapes and dimensions of the catalyst means and of the housing and in particular the cross-sectional shape and the cross-sectional dimensions of the casing to the space available for the catalytic converter. For example, two, and only two, packets of sheet metal members may be provided. The two packets of sheet metal members may be located on opposite sides of a central plane running between them to the inner cavity and may contain passages running away from said central plane and from the inner cavity. The housing may then have a relatively flat cross-sectional shape compared with a housing which is circular in cross-section. The housing may then furthermore have a first cross-sectional dimension measured at right angles to the stated central plane and a second cross-sectional dimension measured parallel to the central plane, which second dimension is smaller than the first cross-sectional dimension. The second, smaller cross-sectional dimension may be at most 70% or at most 60% or even at most only 50% of the first, larger cross-sectional dimension, depending, for example, on the available space. This makes it possible to install the catalytic converter, for example, in the pipe of an exhaust system of an automobile at a point where only a small amount of space is available in a direction transverse to the pipe and to the casing of the housing of the catalytic converter, for example in the vertical direction.

However, it is also possible to provide catalyst means with three packets of sheet metal members and to form the casing of the housing in such a way that it defines a triangle in cross-section, but the casing may have rounded transitions instead of corners. An approximately triangular casing may facilitate installation in certain cases. Such a catalytic converter can then be arranged under the floor of an automobile, for example, in such a way that the lower surface of the casing is formed by a horizontal side of the triangle.

It is also possible to provide catalyst means which have four or more packets of sheet metal members which are distributed around the inner cavity. The casing of the housing may then define in cross-section a polygon having corners replaced by rounded transitions and/or may be more or less circular.

The maximum cross-sectional dimension of the catalyst means in cross-sections at right angles to the axis of the casing may be, for example, smaller than the maximum axial dimension of the catalyst means. Furthermore, the maximum cross-sectional dimension of the casing and of the entire housing may be smaller than the axial dimension of the casing and of the entire housing.

In plan view—i.e. in a projection at right angles to the osculating planes defined by the sheet metal member—each sheet metal member preferably has a quadrilateral contour. Furthermore, each sheet metal member in the plan view or in the stated projection preferably has at least two straight edges parallel to one another, for example at least the two edges bordering the inner cavity and bordering the outer cavity being straight and parallel to one another in the stated projection. Moreover, the two other edges of each sheet metal member are preferably also straight and parallel to one another in the stated projection, so that the sheet metal member in the plan view or in the stated projection forms an oblique-angled or right angled parallelogram. This makes it possible for the sheet metal members to be produced, with at most a small amount of sheet metal waste, from strips having longitudinal edges parallel to one another or from quadrilateral, square or rectangular sheets.

The catalytic converter preferably has an exhaust gas inlet connected to the inner cavity. The inner space or passage bound by the inlet preferably leads directly into the inner cavity which is bounded in cross-section at least partly by the catalyst means. In addition, at its orifice leading into the inner space, the inner space or passage of the inlet preferably has essentially, i.e. at least approximately or, for example, exactly, the same cross-sectional shape and essentially, i.e. at least approximately or exactly, the same cross-sectional dimensions as the inner cavity. Furthermore, the inner cavity preferably has at least one free region which bounds the catalyst means and whose cross-sectional area decreases in a direction away from the inlet. The cross-sectional area of the or each free region of the inner cavity preferably decreases at least in the largest part of the dimension in a direction away from the inlet and, for example, along the entire dimension, in a direction away from the inlet, of the inner cavity and of the catalyst means, at least approximately or exactly linearly with the distance from the inlet. The cross-sectional area of the inner cavity may decrease, for example, at least by 50% or even at least by 80% and namely virtually to zero from the point at which those passages of the catalyst means which are located closest to the inlet lead into the inner cavity to the point at which the passages furthest away from the inlet lead into the inner cavity. During operation, this formation of the inlet and of the inner cavity makes it possible to distribute the exhaust gas flowing into the inner cavity uniformly over all passages of the catalyst means, even in the case of an axial dimension of the inner cavity which is large in comparison with the cross-sectional dimensions of the inner space or passage of the inlet and of the inner cavity, which contributes toward good utilization of the catalytically active material and hence toward production costs which are advantageous relative to the quantity of exhaust gas to be treated per unit time. In addition, the described formation of the inlet in combination with the cross-sectional decrease in the or each free region of the inner cavity counteracts the generation of turbulence, in turn making it possible to keep the pressure loss small.

As already described, the catalytic converter is preferably formed in such a way that the inlet leads directly into the inner cavity bounded at least partly by the catalyst means. The exhaust gas can then make contact with at most small regions of the wall of the housing between flowing out of the inlet and flowing into the passages of the catalyst means. In cross-section, the inner cavity may even be bounded essentially along its entire circumference and essentially exclusively by the catalyst means, so that the exhaust gas can make virtually no contact at all with the wall of the housing between flowing out of the inlet and flowing into the passages of the catalyst means. Furthermore, the inlet has, for example, a socket which is rigidly and tightly connected to the wall of the housing and which projects into the inner space enclosed by the wall of the housing. The catalyst means can then be rigidly fastened to that end of the socket belonging to the inlet which is located in the inner space of the housing. For example, an outlet which likewise has a socket which is rigidly and tightly fastened to the wall of the housing, projects into its inner space and is provided in the latter with a perforation and to which the catalyst means are fastened can also be present. Said catalyst means may therefore be a distance away from the wall of the housing all around. These embodiments of the catalytic converter together with the formation of the catalyst means help to ensure that the catalyst means are rapidly heated to a temperature which permits an effective catalytic treatment of the exhaust gas, during a cold start, i.e. when said catalyst means are still at ambient temperature on starting an engine producing the exhaust gas, at least in a region bordering the inner cavity.

The catalyst means are preferably fastened in the housing without a heat-insulating and sound-insulating intermediate layer which is located between said catalyst means and an inner surface of the wall of the housing and consists of at least one nonmetallic material and/or has a wire braiding. This contributes toward economical production of the catalytic converter.

The passages in the catalyst means preferably have essentially constant cross-sectional areas over their entire lengths. This can help to achieve optimum utilization of the catalytically active material and hence economical production of the catalytic converter.

As already described, each packet of sheet metal members has, for example, alternate first sheet metal members having protuberances and second, essentially flat sheet metal members, the first and second sheet metal members resting against one another at the summit lines of the waves. This formation of the catalyst means makes it possible to achieve a large number of passages per unit area of the sectional surface in a section at right angles to the waves and passages. The sectional surface through the passages belonging to the same group may have a flat part and/or may be at least partly curved, depending on the formation of said passages. In a section at right angles to the passages, the catalyst means preferably have at least about 62 passages per square centimeter (i.e. at least about 400 passages per square inch) or preferably at least about 93 passages per square centimeter (i.e. at least about 600 passages per square inch) or particularly preferably at least about 124 passages per square centimeter (i.e. at least about 800 passages per square inch) or even at least about 186 passages per square centimeter (i.e. at least about 1200 passages per square inch) and, for example, about 248 passages per square centimeter (i.e. about 1600 passages per square inch).

The height of the waves or bulges, measured from wave summit to wave summit or bulge peak to bulge peak, is expediently at most 2 mm, preferably at most 1 mm, preferably at least 0.3 mm and, for example, about 0.5 mm. If the protuberances are formed by waves, the wavelength is, for example, twice to three times as large as the wave height and, at a wave height of about 0.5 mm, is, for example, about 1.2 mm to 1.4 mm.

The catalyst means preferably have retaining means which hold the sheet metal members together and connect them to one another. Each sheet metal member preferably has at least one flat retaining section and, for example, at least two such sections. Each retaining section is preferably rigidly connected to at least one member of the retaining means and/or held by this member at a distance from the retaining section of another sheet metal member. The retaining sections may be rigidly connected to spacer members, for example individually and/or in pairs by weld joints and/or hard solder joints and/or clamp connections. This results in a stable connection of the sheet metal members.

The sheet metal members have, for example, an inner region or core region comprising a metallic material, namely comprising a steel which, in addition to iron, contains about 20% by weight of chromium, about 5% by weight of aluminum and possibly also a little lanthanum and/or yttrium. Those main sections of the sheet metal members which border the passages preferably have a coating of a metal oxide, namely alumina, which is frequently referred to as a wash coat and to which a catalytically active material is applied. This may contain at least one noble metal, such as platinum and/or rhodium. The retaining section of the sheet metal members are preferably untreated and uncoated, so that their surfaces consist of the same material as the inner regions or core regions of the sheet metal members, i.e. of steel.

BRIEF DESCRIPTION OF THE DRAWINGS

The subject of the invention is illustrated below with reference to embodiments shown in the drawings. In the drawings, FIG. 4 shows an oblique view of a catalyst support of the catalyst means of the catalytic converter shown in FIG. 1 to 3, FIG. 5 shows a longitudinal section through a catalytic converter having two catalyst supports parallel to one another, FIG. 6 shows a cross-section along the line VI—VI in FIG. 5, through the catalytic converter shown in FIG. 5, FIG. 7 shows a longitudinal section through another catalytic converter whose catalyst means have two groups of passages, FIG. 8 shows a section along the line VIII—VIII in FIG. 7, through the catalytic converter shown in FIG. 7, FIG. 9 shows a section along the line IX—IX in FIG. 7, through the catalytic converter shown in FIG. 7, FIG. 10 shows a section corresponding to FIG. 8, through another catalytic converter, FIG. 11 shows a longitudinal section through another catalytic converter, FIG. 12 shows a simplified oblique view of the catalytic converter according to FIG. 11, only the contour of the casing of the housing being indicated.

It should also be noted that various Figures are rather schematic and in some cases are not to scale.

DESCRIPTION OF THE PREFERRED EMBODIMENTS

Figure 1:
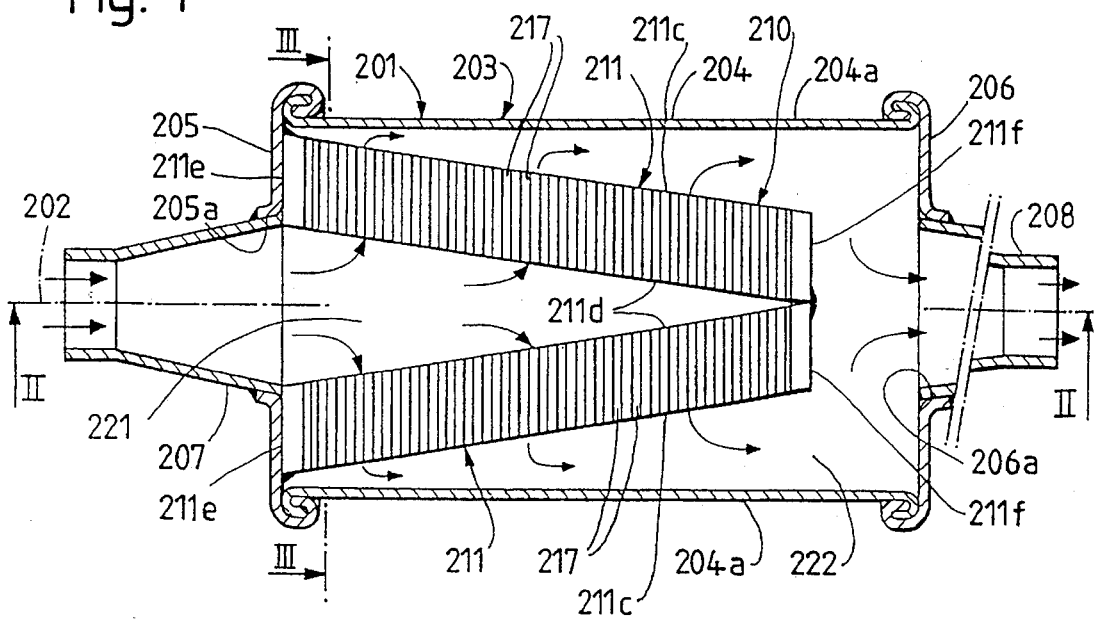
FIG. 1 shows a longitudinal section through a catalytic converter whose catalyst means have two catalyst supports arranged in the form of a V, each having a group of passsages.
Figure 2:
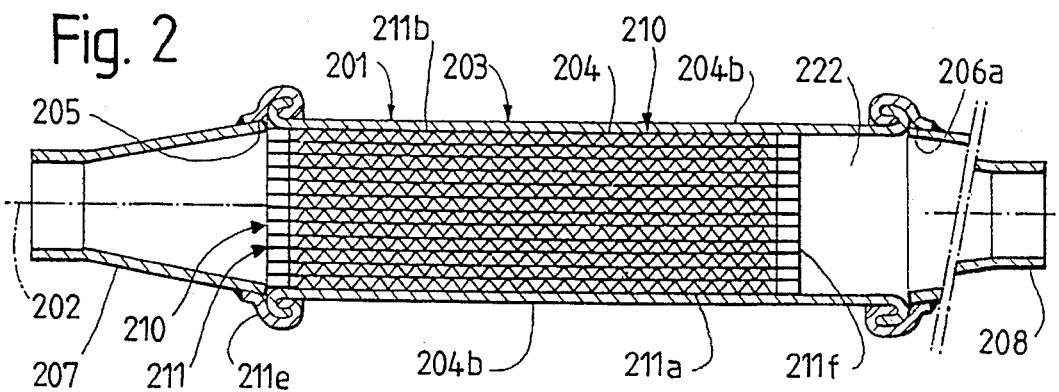
FIG. 2 shows a longitudinal section along the line II—II in FIG. 1, through the catalytic converter shown in FIG. 1.
Figure 3:
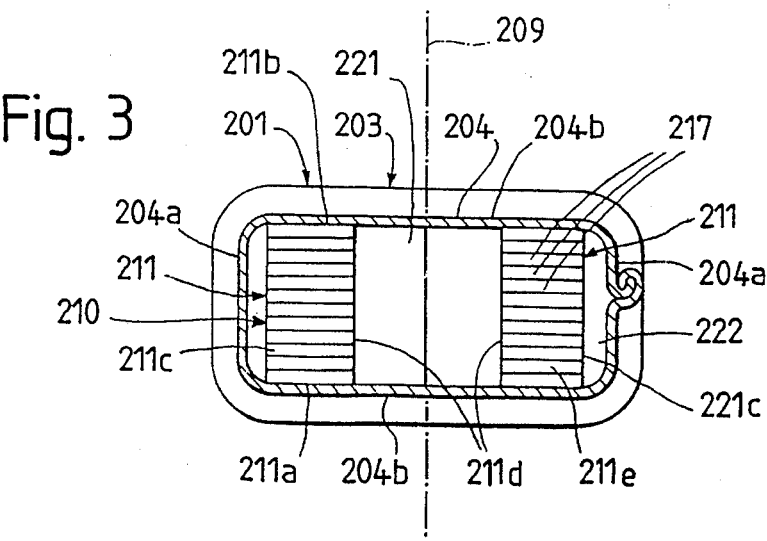
FIG. 3 shows a cross-section along the line III—III in FIG. 1, through the catalytic converter shown in FIG. 1.

The catalytic converter 201 shown in FIG. 1 to 3 defines an axis 202 and has a housing 203. Its wall has a casing 204, a first end wall 205 and a second end wall 206. The casing 204 encloses the axis 202, runs along it and is essentially parallel to it. The casing 204 is formed, for example, from a sheet metal piece whose two edges parallel to the axis are connected firmly and tightly to one another by a flange shown in FIG. 3. The edges of the end walls 205, 206 are, for example, likewise connected by a flange to edges of the casing 204.

In a cross-section at right angles to the axis, the casing 204 is essentially rectangular, but the corners of the rectangle are replaced by curved transitions. The casing thus forms two first side and/or longitudinal walls 204a opposite one another and two second side and/or longitudinal walls 204b opposite one another. The four side and/or longitudinal walls belonging to the casing are essentially—i.e. apart from the curved transitions mentioned and apart from the flanges—flat and parallel to one another in pairs. The housing 203 has a central plane which runs between the two first side and/or longitudinal walls 204a and through the axis 202, is at right angles to the walls 204b, is identical to the sectional plane of FIG. 2 and is denoted by 209 in FIG. 3. The housing 203 and its casing have a first cross-sectional dimension measured at right angles to the central plane 209 and a second cross-sectional dimension measured parallel to the stated central plane, which second cross-sectional dimension is smaller than the first cross-sectional dimension.

The end walls 205, 206 are essentially flat and at right angles to the axis 202 and have contours corresponding to the cross-sectional shape of the casing. The first end wall 205 has a first opening 205a. The second end wall 206 has a second opening 206a. A socket is fastened to each end wall, namely welded in a collar bounding the opening 205a or 206a. Each socket has an outer, cylindrical section and a section widening from this toward the inner space of the housing. The two openings 205a, 206a together with the sockets form the inlet 207 and the outlet 208, respectively, of the catalytic converter. The inlet 207 and the outlet 208 are coaxial with the axis 202.

The housing 203 contains catalyst means 210 having two catalyst supports 211, one of which is shown separately in FIG. 4. Each catalyst support 211 is essentially prismatic in shape and has six essentially flat surfaces or—as will be explained—at least flat osculating surfaces, namely a base surface 211a, a top surface 211b parallel to this, an outer surface 211c, an inner surface 211d parallel to this, a first end surface 211e and a second end surface 211f parallel to this. In the section shown in FIG. 1, the two prismatic catalyst supports 211, like their base surfaces 211a and top surfaces 211b, have the shape of an oblique-angled parallelogram with edges of different lengths. The outer and inner surfaces 211c and 211d, respectively, are rectangular and each connect a longer edge of the base surface to a longer edge of the top surface. The two end surfaces 211e, 211f each connect the shorter edge of the base surface to a shorter edge of the top surface.

Each catalyst support 211 has a packet of alternate first sheet metal members 213 and second sheet metal members 214. Furthermore, each catalyst support has retaining means with spacer members 215, which retaining means hold together the sheet metal members. Each sheet metal member and retaining member consists, for example, of a separate workpiece. In plan view, the sheet metal members 213, 214 have the same contours as the base surface 211a and the top surface 211b of a catalyst support 211 and thus form an oblique-angled parallelogram.

Each first sheet metal member 213 has a main section 213a which is provided with waves 213b which extend parallel to one another and parallel to the end surfaces 211e, 211f from the outer surface 211c to the inner surface 211d. The wave summits 213c and 213d of the waves 213b of each fit sheet metal member 213 define two flat osculating surfaces parallel to the base surface 211a and to the top surface 211b. Accordingly, all flat osculating surfaces defined by first sheet metal members are parallel to one another. The height of the waves, measured from summit to summit, is preferably at least 0.3 mm and, for example, 0.5 mm to 1 mm. The wavelength may be, for example, at least equal to the wave height. Each first sheet metal member 213 has, on those sides of its main section 213a which are opposite one another and namely at the end surfaces 211e, 211f, strip-like, flat retaining sections 213e and 213f which run along the waves and are parallel to these.

Each second sheet metal member 214 is at least essentially flat. The base surface 211a and the top surface 211b of the catalyst support 211 may each be formed, for example, by a second sheet metal member 214. Each second sheet metal member 214 has a main section 214a which rests against the wave summits of an adjacent first sheet metal member 213 in the case of the second sheet metal members forming the base surface or top surface of the catalyst support and against wave summits of two adjacent first sheet metal members 213 in the case of all other second sheet metal members. Each second sheet metal member 214 has, on opposite sides of its main section 214a, a strip-like retaining section 214e or 214f which of course is also flat.

Each spacer member 215 consists of a straight piece of a profiled rod having a quadrilateral cross-section. Apart from the sheet metal members forming the base surface and top surface of the catalyst support, the main sections 213e, 213f, 214e, 214f of the first and second sheet metal members 213, 214 are directly adjacent to one another in pairs. The spacer members 215 extend over the entire length of the waves and are arranged between two retaining sections 213e and 214e or 213f and 214f.

The sheet metal members 213, 214 consist, for example, of the steel mentioned in the introduction. Those two surfaces of the main section 213a, 214a of each sheet metal member 213, 214 which are opposite one another are provided with a coating of alumina. Catalytically active material which contains, for example, platinum and/or rhodium is applied to the alumina coatings. The retaining sections 213e, 213f, 214e, 214f of the sheet metal members are preferably untreated and uncoated, so that their surfaces consist of steel. The spacer members 215 likewise consist of a metallic material—namely steel—and their surfaces facing the waves 213b may likewise be provided with coatings of alumina and catalytically active material.

The adjacent retaining sections 213e, 214e, 213f, 214f and spacer members 215 are rigidly connected, namely welded, to one another. The adjacent main sections of the sheet metal members 213, 214 together bound passages 217 which, like the waves 213b, extend from the outer surface 211c to the inner surface 211d. The two surfaces 211c, 211d thus form the outer and the inner orifice surface, respectively, of the passages. Each catalyst support 211 thus has a group of straight passages 217 which are parallel to one another and to the surfaces 211a, 211b, 211e, 211f and pass between these surfaces. Each passage 217 has a cross-sectional area which is constant over its entire length. Apart from the passages adjacent to the spacer members 215, all passages furthermore have cross-sectional areas of the same magnitude. Moreover, all passages are of equal length.

As already mentioned, the base surface 211a and the top surface 211b of each essentially prismatic catalyst support 211 are each formed, for example, by a second sheet metal member 214 and are accordingly essentially flat. However, it would also be possible for at least one of the two most widely spaced sheet metal members of each catalyst support 211 to consist of a second, wavy sheet metal member. If this is the case, the base surface and/or top surface of the catalytic converter is understood as meaning the flat osculating surface molding to the outer wave summits of the relevant, outermost sheet metal member.

The base surface 211a and the top surface 211b of each catalyst support 211 face one of the two side and/or longitudinal walls 204b and—in the sense explained above—are essentially flat and parallel to the second side or longitudinal walls 204b. The base surfaces 211a and top surfaces 211b of the two catalyst supports 211 each rest, for example according to FIG. 2 and 3, against one of the two second broader, side and/or longitudinal walls 204b of the housing 203.

The surfaces 211c, 211d, 211e, 211f of the two catalyst supports 211 are at right angles to the base surface 211a, to the top surface 211b and to the second, broader side and/or longitudinal walls 204b of the housing. The first outer surface 211c and the first end surface 211e make with one another an angle which is denoted by alpha in FIG. 4, differs from 90° and is at least 45°, preferably at least 60° and, for example, 75° to 87°.

The two catalyst supports 211 are tightly fastened, for example welded, at their first end surfaces 211e to regions of the end wall 205 which are located in FIG. 1 on opposite sides of the axis 202 and of the orifice of the inlet 207. The outer surfaces 211c of the two catalyst supports 211 are opposite to one another and face one of the first side and/or longitudinal walls 204a. The two inner surfaces 211d of the two catalyst supports face one another and approach one another in a direction away from the inlet 207. The surfaces 211c, 211d make, with the central plane 209 passing through the axis 202, an angle which is equal to the difference 90°–alpha and is therefore at most 45°, preferably at most 30° and, for example, 3° to 15°. The two catalyst supports 211 are tightly and firmly connected to one another at their end surfaces 211f facing away from the inlet 207, for example are welded directly and/or via a member connecting them. In the section shown in FIG. 1, the two catalyst supports together thus form a V and are axially symmetrical with one another relative to the central plane 209 passing between them.

The stated first and the second cross-sectional dimension of the casing 204 and also the maximum cross-sectional dimension measured between diagonally opposite corners of the casing 204 and of the entire housing are smaller than the length of the casing 204. Furthermore, the cross-sectional dimensions of the catalyst means 210 which are measured analogously at right angles to the axis 202 are all smaller than the length of the catalyst means 210 which is measured parallel to the axis 202.

The inner space or passage of the inlet 207 leads, at the first opening 205a of the housing 203, into an inner cavity 221 which is present in said housing between the inner surfaces 211d of the two catalyst supports 211 and has a polygonal, namely quadrilateral, cross-section. At its orifice leading into the inner cavity 221, the inner space of the inlet 207 has essentially, i.e. at least approximately and preferably exactly, the same polygonal, namely quadrilateral, contour or cross-sectional shape and essentially, i.e. at least approximately and preferably exactly, the same contour dimensions or cross-sectional dimensions as that end of the inner cavity 221 which is located closer to the inlet. Said inner cavity contains no fixed parts and is thus completely free and becomes narrower in the direction away from the inlet in FIG. 1, along the axis 202. The width and the cross-sectional area of the inner cavity 221 decrease linearly in a direction away from the inlet 207, so that they decrease almost to the value zero, i.e. virtually disappear, at the inner ends of the passages 247 furthest away from the inlet.

The two groups of passages 217 formed by the catalyst supports are at right angles to the central plane 209 and run on opposite sides to one another and outward away from the inner cavity 221. Furthermore, at the outer passage ends leading into the outer cavity 222, the two groups of passages 217 are a distance apart which is very much greater than the distance between adjacent passages belonging to the same group, i.e. to the same catalyst support.

Intermediate spaces which, together with an intermediate space resent between the inner surface of the end wall 206 of the housing and the end surfaces 211f of the catalyst support, form an outer cavity 222 which is connected to the inner space of the outlet 208 at the second end wall 206 of the housing are present between the inner surfaces of the first side or longitudinal walls 204a of the housing and the first side surfaces 211c of the catalyst support, which side surfaces face said inner surfaces. That orifice of the inner space or passage of the outlet 208 which leads into the outer cavity 222 may be circular or, analogously to the orifice of the inlet 207, quadrilateral.

The catalytic converter 201 can be used, for example, by installing it in a pipe of an exhaust system of the gasoline combustion engine of an automobile and arranging it under the floor thereof in such a way that the second, broader side and/or longitudinal walls 204b of the housing are approximately parallel to the floor of the automobile and to the surface on which the latter stands or travels. Owing to its relatively flat shape, the catalytic converter 201 then occupies only a small height.

During operation of the catalytic converter 201, an exhaust gas stream indicated by arrows in FIG. 1 is formed in said catalytic converter. The exhaust gas flows through the inlet 207 into the inner cavity 221, is deflected therein and flows, at the inner surfaces 211d of the catalyst supports which serve as exhaust gas entry surfaces, into the inner ends of the passages 217. The exhaust gas is catalytically treated while flowing through the passages and emerges from the catalyst supports again at the outer surfaces 211c serving as exhaust gas exit surfaces and then flows through the outer cavity 222 to the outlet.

The inclination of the inner surfaces 211d relative to the axis 202 and the resulting decrease in the cross-sectional area of the inner cavity with increasing distance from the inlet help to ensure that, on flowing into the catalyst support, the exhaust gas stream is uniformly distributed over the entire, relatively large inner surface 211d serving as exhaust gas entry surface and accordingly uniformly over all passages 217. This makes it possible to achieve high efficiency in the catalytic treatment and to minimize the pressure loss or opposite pressure caused by the catalytic converter.

Between the orifice of the inlet 207, which orifice is formed by the first opening 205a, and the outer surfaces 211d of the catalyst supports, which outer surfaces serve as exhaust gas entry surfaces, the exhaust gas can come into contact only with relatively small regions of the walls of the housing 203. Accordingly, the exhaust gas can release only a small amount of heat via the housing wall to the environment between the inlet and the exhaust gas entry surface of the catalyst supports. The two catalyst supports likewise release heat only relatively slowly via the housing wall to the environment. In the case of a cold start, at least those regions of the catalyst supports 211 which border the inner cavity 221 are therefore rapidly heated by the exhaust gas to a temperature which permits effective catalytic treatment of the exhaust gas.

The catalytic converter 231 shown in FIG. 5 and 6 defines an axis 232 and has a housing 233 with a casing 234. This has two first side and/or longitudinal walls 234a and two second side and/or longitudinal walls 234b. The casing 234 is once again essentially rectangular in cross-section, so that the side and/or longitudinal walls are essentially flat and parallel to one another in pairs. Furthermore, the first side and/or longitudinal walls 234a are narrower than the second side and/or longitudinal walls 234b. The housing has a first end wall 235 with a first opening 235a and a second end wall 236 with a second opening 236a. The two openings together with sockets soldered into them form an inlet 237 or an outlet 238. A central plane 239 passing through the axis 232 between the two walls 234a is shown in FIG. 6.

The housing contains catalyst means 240 having two catalyst supports 241 which are arranged on opposite sides of the central plane 239 and are symmetrical with respect to this plane. Each catalyst support 241 has a base surface 241a, a top surface 241b, an outer surface 241c, an inner surface 241d, a first end surface 241e and a second end surface 241f. In the section shown in FIG. 5, the two catalyst supports 241 form a parallelogram having sides at right angles to one another, namely a rectangle. Accordingly, the base surface 241a and the top surface 241b of each catalyst support 241 form a rectangle. The surfaces 241c, 241d, 241e, 241f are at right angles to the base surface 241a and to the top surface 241b. Each catalyst support 241 thus forms essentially a right parallelepiped prism.

Apart from the other forms of their base and top surfaces, the two catalyst supports 241 are, for example, formed similarly to the catalyst supports 211. They have in particular first sheet metal members provided with waves and second, essentially flat sheet metal members.

In plan view, the various sheet metal members of the catalyst supports 241 then form a right angled parallelogram, namely a rectangle, and, for example as in the case of the catalyst support 211, may each consist of a separate sheet metal piece and may be welded to one another and to spacer members. However, the sheet metal members belonging to the same catalyst support may also be formed by sections of a one-piece, folded metal strip and may be linked alternately at the first or second end surface by means of a fold. Furthermore, each catalyst support 241 has a group of straight passages which are parallel to one another and run at right angles to the inner surface 241d from the latter to the outer surface 241c.

Each base surface and top surface 241a, 241b of the two catalyst supports 241 faces one of the second broader side or longitudinal walls 243b and rests against one of these walls. The first end surfaces 241e of the two catalyst supports 241 rest on opposite sides of the first opening 235a at the first end wall 235 and are connected thereto, for example by weld connections. The surfaces 241c, 241d of the two catalyst supports 241 are parallel to one another and to the central plane 239.

Accordingly, the passages 247 are at right angles to the central plane 239. The outer surfaces 241c of the two catalyst supports are each opposite one of the first, narrower side and/or longitudinal walls 234a and a distance away therefrom and are parallel to these walls 234a. The inner surfaces 241d of the two catalyst supports are parallel to one another and are at a distance apart over their entire lengths. The two second end surfaces 241f of the catalyst supports, which surfaces are opposite to the first end wall 235, are tightly and firmly connected, for example welded, to an end and/or terminating member 249 which is formed from a rectangular sheet and is a distance away from the second end wall 236. The two catalyst supports 241 and the two groups of passages 247 formed by them are everywhere a distance apart which is very much greater than the distance between adjacent passages present in the same catalyst support.

A preferably hollow bounding member 250 inserted between the two catalyst supports 241 has an end 250a which has a quadrilateral, rectangular or square cross-section and is firmly and tightly connected, for example welded, to the end and/or terminating wall 249 and/or directly to those ends of the catalyst supports 241 which are opposite to the inlet. The width, measured parallel to the passages 247, of the end 250a of the bounding member 250 is almost or exactly equal to the distance between the inner surfaces 241d of the two catalyst supports, which surfaces face one another. The bounding member 250 projects between the two catalyst supports 241 approximately up to the orifice of the inlet 237. At the orifice of the inlet, the bounding member has a blade-like or possibly slightly rounded end whose edge or summit line lies in the stated central plane which runs between the two walls 234a and between the two catalyst supports 241 and through the axis 232. The bounding member 250 has two bounding surfaces 250b which face away from one another and each of which faces an inner surface 241d of one of the catalyst supports 241. The two bounding surfaces 250b slope toward one another along the axis 232 in a direction away from the inlet 237, so that each bounding surface approaches, in a direction away from the inlet, that inner surface 241d of a catalyst support 241 which is opposite it. The bounding surfaces 250b are flat and make an angle of at most 45°, preferably at most 30° and, for example, at most 15° with the axis 232, the central plane running between them and the inner surfaces 241d. The bounding member 250 furthermore has two surfaces 250c which are parallel to one another and to the second side or longitudinal walls 234b of the housing and each of which faces one of the two side or longitudinal walls 234b and rests against it.

The inner space of the inlet 237 leads into an inner cavity 251 present between the two catalyst supports 241. The bounding member 250 divides the inner cavity 251, at least in the major part of its axial extension, into two free regions whose widths and cross-sectional areas decrease linearly along the axis 232 in a direction away from the inlet 237 and become virtually zero at the passages furthest away from the inlet. An outer cavity 252 which joins the inner space of the outlet 238 is present between the first side or longitudinal walls 234a and the end wall 236 of the housing 234 and the first side surfaces 241c of the catalyst supports and the terminating wall 249.

During operation of the catalytic converter 241, the exhaust gas flows through the inlet 237 into the inner cavity 251 divided by the bounding member 250 into two free regions. The exhaust gas is deflected in these free regions of the inner cavity 251 and flows in the passages 247 of the catalyst supports 241 at the inner surfaces 241d of the catalyst supports 241, which inner surfaces border the free cavity regions and are parallel to the axis 232. The deflection of the exhaust gas in the inner cavity 251 is supported by the bounding surfaces 250b sloping away from the inlet 237 toward the inner surfaces 241b serving as exhaust gas entry surfaces. The exhaust gas then flows out of the passages 247 into the outer cavity 252 and through the latter to the outlet.

Unless stated otherwise above, the catalytic converter 231 is formed in the same way as the catalytic converter 201 and has similar properties to the latter.

The catalytic converter 261 shown in FIG. 7 to 9 has an axis 262 and a housing 263 with a casing 264 enclosing the axis 262. Said casing has two first side and/or longitudinal walls 264a which, for example, are arc-shaped in cross-section and two second longitudinal walls 264b which, for example, are flat and parallel to one another. The casing is connected at its ends to a first end wall 265 and to a second end wall 266. The two end walls have an opening 265a or 266a which is coaxial with the axis 262 and into which is welded a socket serving as inlet 267 or outlet 268. The housing defines a central plane 269 running between the walls 264a and through the axis 262 and has a first cross-sectional dimension which is measured at right angles to said central plane and a second cross-sectional dimension which is measured parallel to the central plane 269 and which once again is smaller than the first cross-sectional dimension.

The catalyst means 270 arranged in the housing have two catalyst supports 271. These are symmetrical with respect to the central plane 269. The two catalyst supports 271 have essentially flat abutting base surfaces 271a and flat, abutting top surfaces 271b or a common, continuous base surface 271a and a common, continuous top surface 271b. Each catalyst support 271 furthermore has an outer surface 271c, an inner surface 271d, a first end surface 271e and a second end surface 271f. The surfaces 271a, 271b are parallel to one another and to the walls 264b and rest against the latter. The two inner surfaces 271d are ruled surfaces curved in cross-section and meet one another at the longitudinal edges parallel to the axis 262. Those edges of the two inner surfaces 271d which are closer to the inlet 267 and are shown in FIG. 8 together form a closed line, namely a circle. The two inner surfaces 271d are therefore a distance apart at their end located at the inlet 267, in their central cross-sectional regions—i.e. with the exception of their abutting longitudinal edges. The central cross-sectional regions of the two inner surfaces 271c approach one another in the direction away from the inlet 267 in such a way that, at their ends further away from the inlet, they have straight, essentially coincident edges lying in the central plane 269. In the cross-section located between the two ends of the catalyst supports and shown in FIG. 9, the two inner surfaces 271d together are lens-shaped. The two outer surfaces 271c are likewise ruled surfaces curved in cross-section. In all sections parallel to the axis 262 and at right angles to the central plane 269, each outer surface 271c is at least approximately parallel to the inner surface 271d of the relevant catalyst support 271.

Each catalyst support 271 is formed from a packet of at least originally rectangular, alternating first and second sheet metal members. The first sheet metal members have waves. The waves are at right angles to the longitudinal edges of the first sheet metal members. The second sheet metal members are essentially flat. In the production of the catalyst supports 271, the first and second sheet metal members are rotated relative to one another and stacked one on top of the other and rigidly connected to one another by retaining means with spacer members arranged at the ends of the catalyst supports, in such a way that the outer and the inner longitudinal edges of the sheet metal members together form the outer surfaces 271c and the inner surfaces 271d, respectively, of the catalyst supports. If the sheet metal members of the prepared catalyst supports remain exactly rectangular, the end surfaces 271e, 271f form curved ruled surfaces. However, at least in their regions abutting the inner surfaces 271d, the first end surfaces 271e may be made flat and parallel to the first end wall 265 against which they rest in the prepared catalytic converter 261. The two catalyst supports 271 are connected rigidly and tightly to one another, for example welded. Furthermore, the two catalyst supports are connected, for example welded, to the housing 263. In particular, the first end surfaces 271e of the catalyst supports are connected tightly to the first end wall 265 of the housing.

Each catalyst support 271 has a group of straight passages 277 which run from the inner surface 271d to the outer surfaces 271c. All passages 277 are parallel to the second side and/or longitudinal walls 264b and thus also to one and the same plane. Furthermore, all passages formed by the same pair of sheet metal members are parallel to one another. On the other hand, the passages make with the central plane 269 angles whose value is dependent on the distance from the plane at right angles to the central plane 269 through the axis 262 and through the middle of the catalyst supports. At the passages closest to the base surface 271a or the top surface 271b, the stated angle is at least approximately 90°. At the sectional plane located in the middle between the base surface and the top surface in FIG. 7, the passages 277 then make with the central plane 269 an angle which differs from 90° and is preferably at least 45° and, for example, at least 60°. The passages 277 have a cross-sectional area which is constant over their entire length. Furthermore, all passages 277 are at least approximately of the same length.

The inlet 267 leads into an inner, free cavity 281 enclosed by the two inner surfaces 271d. The inlet orifice leading into the inner cavity is circular and has approximately the same diameter as that end of the inner cavity 281 which is located at the first end wall 265. Depending on the formation of the inner surfaces 271d of the catalyst supports, the cross-sectional area of the inlet cavity 281 decreases linearly with the distance from the inlet, in a direction away from the inlet. An outer cavity 282 connected to the outlet 268 is present between the outer surfaces 271c and the second end surfaces 271f and the walls 264a, 266 of the housing. In the catalytic converter 261, it is true that the inner orifice surfaces of the two groups of passages, which surfaces are formed by the inner surfaces 271d, abut one another. In the remaining parts of the passages and in particular at their outer ends leading into the outer surfaces 271c, the two groups of passages are, however, once again a distance apart.

During operation of the catalyst 261, exhaust gas is introduced through the inlet 267 into the inner cavity 281, enters the passages 277 of the two catalyst supports 271 at the inner surfaces 271d serving as exhaust gas entry surfaces, flows out of the catalyst supports again at the outer surfaces 271c serving as exhaust gas exit surfaces and then flows through the outer cavity 282 to the outlet 268. Since the inner cavity 281 of the catalytic converter 261 is bounded essentially completely and exclusively by the inner surfaces 271d of the catalyst supports 271, the exhaust gas, between flowing out of the inlet and flowing into the catalyst supports, can release even less heat to the environment of the catalytic converter 261 than in the case of the catalytic converters 201 and 231 described above. Accordingly, during a cold start, the catalyst supports 271 tend to be heated to the operating temperature required for the catalytic treatment of the exhaust gas more rapidly than in the case of the catalytic converters 201 and 231.

The catalytic converter 291 shown in FIG. 10 has a housing 293 with a casing 294 and catalyst means 295 arranged in the housing. The catalytic converter 291 is formed substantially similarly to the catalytic converter 261 shown in FIG. 7 to 9 but differs from this in that an outer cavity 297 completely enclosing the catalyst means 295 is present between the casing 294 and the catalyst means 295.

The catalytic converter 301 shown in FIG. 11 and 12 has an axis 302 and a housing 303. This is formed similarly to the housing 263 and has a casing 304, end walls 305 and 306, an inlet 307 and an outlet 308. The housing 303 contains catalyst means 310 having two catalyst supports 311 arranged on different sides of a central plane of the housing. Said catalyst supports have a base surface 311a, a top surface 311b, an outer surface 311c, an inner surface 311d and two end surfaces 311e, 311f. The inner surfaces 311d are parallel to the axis 302 and together form a cylindrical surface approximately circular in cross-section. The outer surfaces 311c are likewise parallel to the axis 302 and curved in cross-section in such a way that the distances, measured at right angles to the stated central plane, from the outer surface 311c to the inner surface 311d of the relevant catalyst support are equal everywhere. The end surfaces 311e and 311f of the catalyst supports are flat and at right angles to the axis 302. Each catalyst support 311 has first sheet metal members with waves, some of which are shown in 12, and second, essentially flat metal members. Each catalyst support has a group of straight passages 317 which run at right angles to the stated central plane from the inner surface 311d to the outer surface 311c and are essentially equal in length.

The two catalyst supports 311 are rigidly and tightly connected to one another and to the end wall 305. A disk-like end and/or terminating member 319 is fastened to that end of the catalyst supports 311 which is opposite to the end wall 305. Said member 319 holds a bounding member 320 which projects, approximately as far as the inlet orifice, into the inner cavity 321 enclosed by the inner surfaces 311d. The bounding member 320 is, for example, hollow, rotationally symmetrical with the axis 302 and approximately paraboloid and has a bounding surface 320a on the outside. Said bounding surface, together with the inner surfaces 311d of the two catalyst supports 311, bounds a free region of the inner cavity 321, said free region having an annular cross-section. The cross-sectional area of this free region of the inner cavity 321 decreases linearly in a direction away from the inlet 307, so that it has a value of almost zero at the inner ends of the passages 317 furthest away from the inlet. The outer ends of the passages 317 lead into an outer cavity 322 which is connected to the outlet 308.

Unless stated otherwise above, the catalytic converter 301 is formed similarly to the catalytic converter 261.

Figure 13:
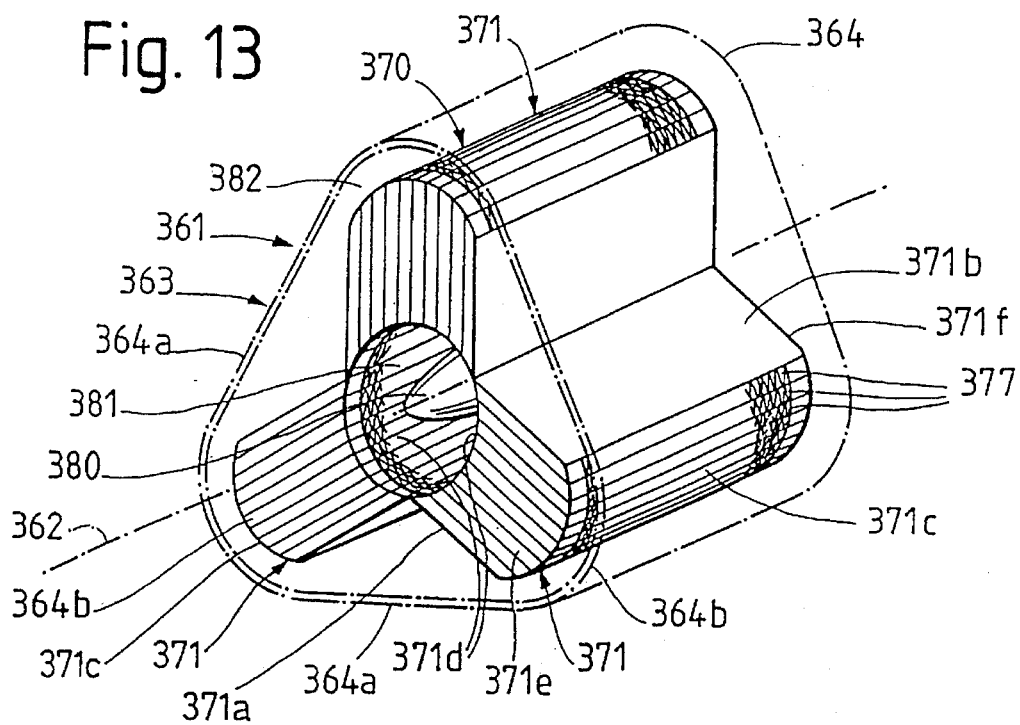
FIG. 13 shows an oblique view of parts of a catalytic converter whose catalyst means have three groups of passages.

The catalytic converter 361 shown partially in FIG. 13 defines an axis 362 and has a housing 363, of which only the contour of the casing 364 enclosing the axis 362 is indicated. Said casing has three flat side and/or longitudinal walls 364a distributed around the axis and defines in cross-section an equilateral triangle, but the corners of the triangle are replaced by side and/or longitudinal walls 364b which are curved in cross-section.

The housing 363 contains catalyst means 370 having three catalyst supports 371 which are distributed around the axis 362 and project toward the curved walls 364b. Each of these catalyst supports has two flat side surfaces 371a and 371b parallel to one another and to the axis 362, an outer surface 371c, an inner surface 371d and two end surfaces 371e and 371f. The outer surfaces 371c and inner surfaces 371d are curved in cross-section and parallel to the axis 362. The three inner surfaces 371d together form a cylindrical surface which is circular in cross-section. The outer surfaces 371c are everywhere at least approximately the same distance away from the inner surfaces 371d, measured parallel to the side surfaces 371a, 371b of the relevant catalyst support. The end surfaces 371e, 371f are essentially flat and at right angles to the axis 362. Each catalyst support 371 has a packet of rectangular, alternating first and second sheet metal members. The first sheet metal members have waves, some of which are indicated in FIG. 13, while the second sheet metal members are essentially flat and parallel to the axis 362. Each catalyst support has a group of straight passages 377 which extend parallel to a plane passing through the axis 362 and the relevant catalyst support and to one another, from the inner surfaces 371d to the outer surface 371c, are at right angles to a plane passing through the axis 362 and opposite the inner surface 371d of the relevant catalyst support, have a constant cross-sectional area over their entire length and are all at least approximately of the same length.

The three catalyst supports 371 enclose an approximately paraboloid bounding member 380. This, together with the inner surfaces 371d of the catalyst supports 371, bounds a free region, annular in cross-section, of an inner cavity 381 which is enclosed in cross-section completely by the inner surfaces 371d and into which leads the inlet which is not shown and whose cross-sectional area decreases in a direction away from the inlet. The outer cavity 382 present between the casing 364 and the surfaces 371a, 371b, 371c of the catalyst supports 371 is connected to the housing outlet, which is not shown. The three groups of passages 377 thus run in three different directions from the inner cavity 381 toward the outer cavity 382 and, with the exception of the inner ends of the passages, are a distance apart everywhere.

Figure 14:
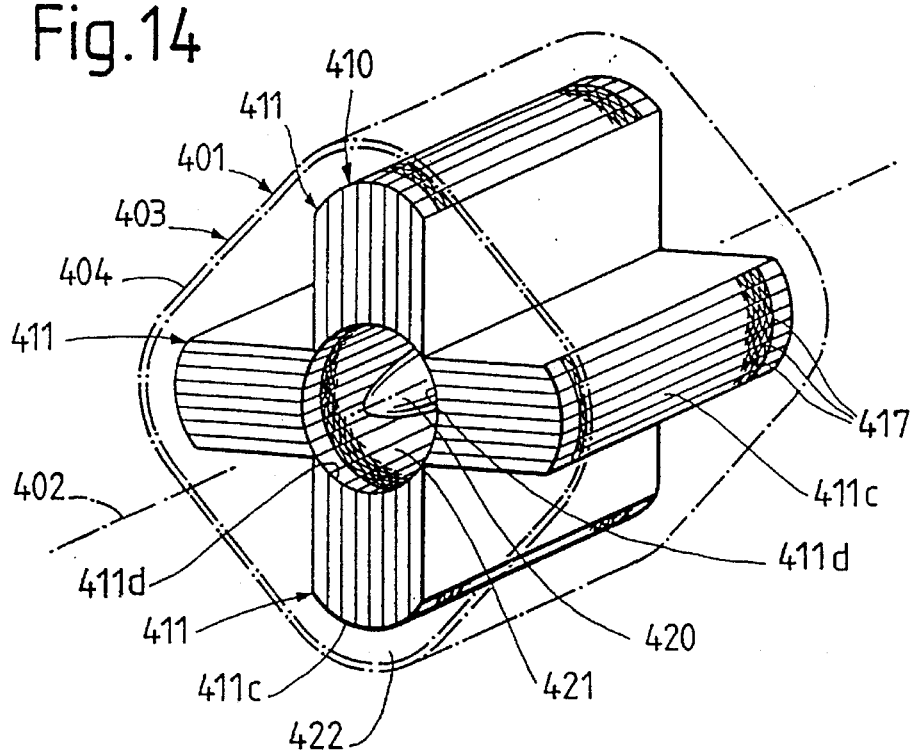
FIG. 14 shows an oblique view of parts of a catalytic converter having catalyst means which have four groups of passages.

The catalytic converter 401 shown in FIG. 14 defines an axis 402 and has a housing 403, of which only the casing 404 is indicated. The latter has, for example, four flat walls distributed around the axis and four walls which are curved in cross-section, but could instead have a cross-section which is curved everywhere and more or less circular.

The housing 403 contains catalyst means 410 having four catalyst supports 411. These are uniformly distributed around the axis 362 and together form a cross. The catalyst supports 411 are formed similarly to the catalyst supports 371 and each have in particular an outer surface 411c and an inner surface 411d. Each catalyst support 411 once again has a packet of sheet metal members and a group of straight passages 417 which are parallel to one another and run from the inner surface 411d to the outer surface 411c. The inner surfaces 411d together form a closed cylindrical surface and then close a paraboloid bounding member 420 and an inner cavity 421 having an annular free region whose cross-sectional area decreases in a direction away from the inlet which leads into said free region and is not shown. An outer cavity 422 connected to the outlet, which is not shown, is present between the casing 404 and the outer surfaces 411c.

Figure 15:
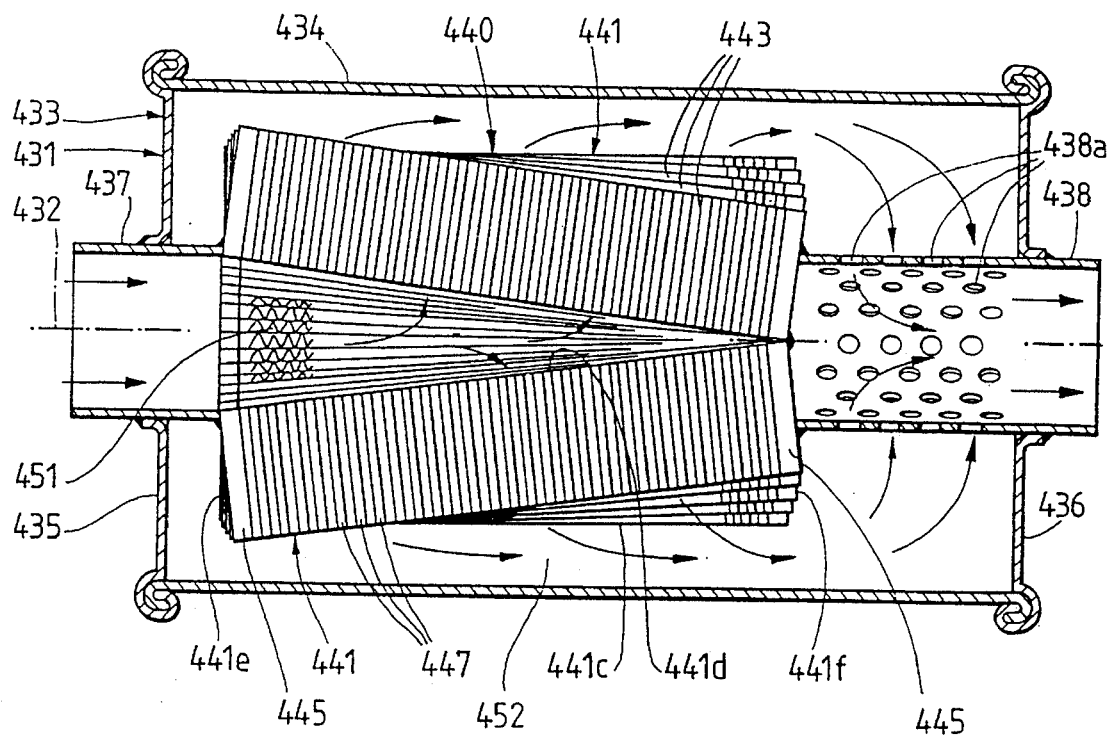
FIG. 15 shows a longitudinal section through a further catalytic converter.
Figure 17:
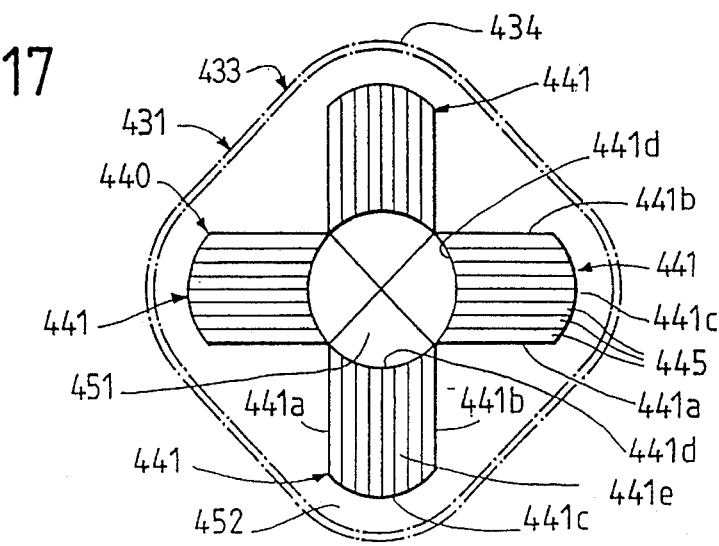
FIG. 17 shows a view of the catalyst means according to FIG. 16 in the direction of view indicated therein by the arrow XVII, the casing of the housing also being shown.
Figure 18:
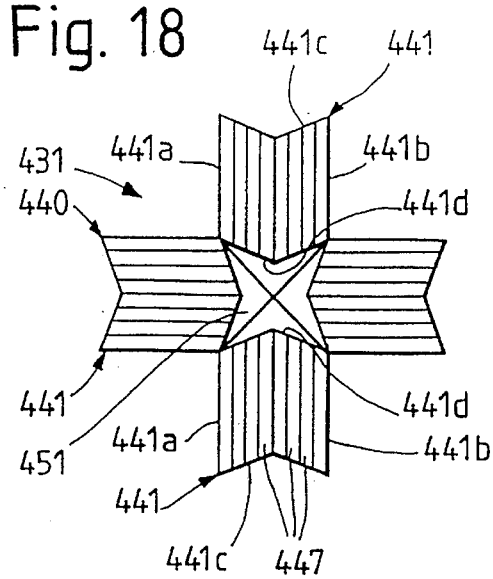
FIG. 18 shows a cross-section through the catalyst means shown in FIGS. 15 to 17.
Figure 19:
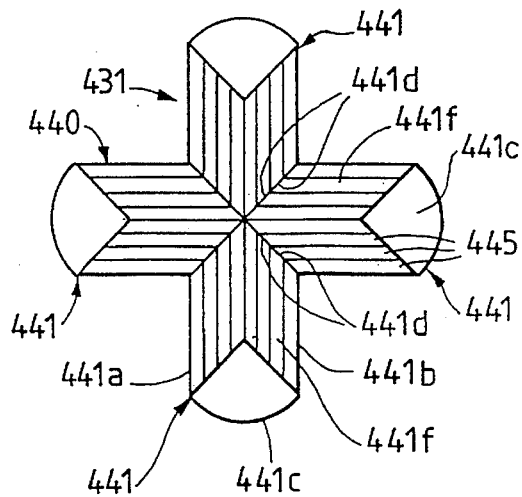
FIG. 19 shows a view of the catalyst means shown in FIGS. 15 to 18, in the direction of view indicated in FIG. 16 by the arrow XIX.

The catalytic converter 431 shown schematically in FIG. 15 defines an axis 432 and has a housing 433 with a metallic wall. The latter has a casing 434 parallel to the axis 432 and end walls 435, 436 which are arranged at both ends of said casing and connected tightly and firmly to said casing by flanges. The casing is also indicated in FIG. 17 and, in this Figure, has in cross-section, for example, approximately the shape of a square whose corners are replaced by rounded transitions. The two end walls 435, 436 are essentially flat and at right angles to the axis 432 and have a hole in the center. The inlet 437 and the outlet 638 of the catalytic converter 431 each have a socket which consists of a cylindrical pipe section which passes through the hole in the first end wall 435 and that in the second end wall 436, projects into the inner space enclosed by the wall of the housing and is rigidly and tightly connected, namely welded, to the relevant end wall. That segment of the socket or pipe section located in the stated inner space and belonging to the outlet 438 is provided with holes 438a distributed over its casing.

Figure 16:
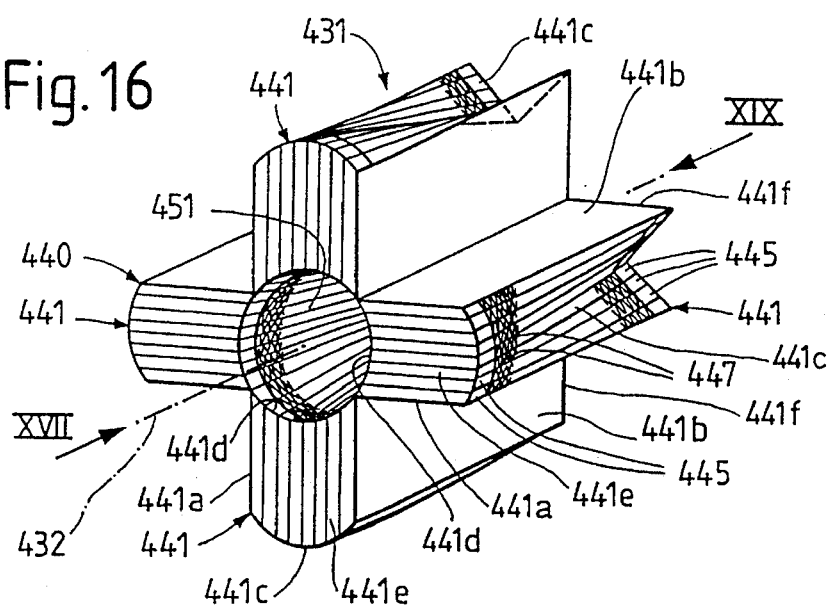
FIG. 16 shows a simplified oblique view of the catalyst means of the catalytic converter shown in FIG. 15.

The catalytic converter 431 has catalyst means 440 which are arranged in the housing, are also shown in FIGS. 16, 17, 18 and 19 and have four catalyst supports 441 which are distributed around the axis 432 and together form a cross. Each of these catalyst supports has two flat side surfaces 441a and 441b parallel to one another and to the axis 432, an outer surface 441c, an inner surface 441d with two end surfaces 441e and 441f. The four inner surfaces 441d together form a surface completely enclosing the axis. On the other hand, the outer surfaces 441c of the four catalyst supports 441 are a distance apart. Those edges of the inner surfaces 441d which abut the end surfaces 441e and are shown in FIG. 15 and 16 together form a closed line, namely essentially a circle. The outer surfaces 441c and inner surfaces 441d consist of ruled surfaces and, in each catalyst support 441, are straight and parallel to one another in all sections parallel to its side surfaces 441a, 441b. The longitudinal edges of the four outer surfaces 441c and of the four inner surfaces 441d are furthermore parallel to the axis 432 and are associated with one another in pairs. The remaining, central cross-sectional regions of the outer and inner surfaces are inclined from the end surfaces 441e toward the axis so that the inner surfaces 441d of each catalyst support 441 has, at its end surface 441f, a V-shaped edge which lies at the edge of an adjacent inner surface 441d in the case of each V limb. At their edges abutting the end surfaces 441f, the four inner surfaces 441d accordingly converge to two intersecting straight lines.

Each catalyst support 441 has a packet of alternating first and second sheet metal members. The first sheet metal members 443 have waves, some of which are indicated in FIGS. 15 and 16. Each first sheet metal member 443 defines two flat osculating surfaces which mold to its wave summits. The second sheet metal members are once again essentially flat. In a projection at right angles to the flat osculating surfaces of the first sheet metal members 443 and to the surfaces and osculating surfaces of the second sheet metal members, the sheet metal members are rectangular so that particularly the two longer edges of each sheet metal member are straight and parallel to one another. The waves of each first sheet metal member 443 are straight, parallel to one another and at right angles to the longitudinal edges of the relevant sheet metal member. The sheet metal members belonging to the same catalyst support 441 are rigidly connected to one another by retaining means in such a way that the second, flat sheet metal members rest against the wave summits of the first sheet metal members 443. The retaining means may have, for example, strip-like or bar-like spacer members 445 which, similarly to the spacer members 215 of the catalyst support shown in FIG. 4, are arranged at the shorter edges of the sheet metal members and are at least approximately parallel to waves of the first sheet metal member 443 resting against them. However, the sheet metal members belonging to the same catalyst support are rotated relative to one another in such a way that their longitudinal edges together form the outer surface 441c and inner surface 441d, each of which consists of a curved ruled surface. The sheet metal members belonging to one and the same catalyst support 441 are welded at their shorter edges to one another and to the spacer members. The end surfaces 441e, 441f may consist of curved ruled surfaces which result when the rectangular sheet metal members are rotated. However, the end surfaces 441e are shown as planes in FIG. 16 for the sake of simplicity. However, the end surfaces 441e and/or 441f could be machined to make them flat and at right angles to the axis 432. The four catalyst supports 444 are rigidly and tightly connected, namely welded, to one another at the longitudinal edges of their inner surfaces 441d and at those edges of the inner surfaces 441d which are located in the end surfaces 441f. If necessary, struts or the like which are not shown and which additionally connect the various catalyst supports to one another may also be present. Each catalyst support 441 has a group of straight passages 447 which run from the inner surface 441c to the outer surface 441d. All passages 447 belonging to the same catalyst support 441 are parallel to one and the same plane passing through the axis 432 and through the middle of the catalyst support and to the side surfaces 441a, 441b. The passages 447 are furthermore at right angles to the longitudinal edges of the first sheet metal members bounding them. The passages 447 belonging to the same catalyst support 441 thus have different directions which, analogously to the catalytic converter 261 shown in FIGS. 7 to 9, are dependent on the distance from the plane passing through the axis 432 and through the middle of the catalyst support 441. It should also be noted that, in comparison with its outer dimensions, each catalyst support 441 actually has many more sheet metal members than are shown in FIGS. 16 to 20.

The catalyst means 440 are connected, at the end surfaces 441e, 441f, rigidly to those ends of the sockets which are located in the inner space of the housing 443 and form the inlet 437 and the outlet 438. The catalyst means 440 are a distance away from the wall of the housing 433 all around. The socket forming the inlet 437 leads, at its end connected tightly to the four catalyst supports 441, into the inner cavity 451 enclosed by the inner surfaces 441d. In accordance with the arrangement of the catalyst supports, the passages 447 belonging to the four catalyst supports 441 accordingly run away from the inner cavity 451 on four different sides of the inner cavity 451, distributed uniformly around the axis 432. The internal diameter of the inlet 437 and in particular of its end connected to the catalyst means 440 is approximately, and preferably exactly, equal to the diameter of the circle formed by those edges of the inner surfaces 441d which lie in the end surfaces 441e, so that the inner cavity 451 connects continuously with the inner space of the inlet. The inner cavity 451 is completely free, i.e. contains no bounding member corresponding to the bounding members 250, 380, 420, and has a cross-sectional area which decreases linearly along the axis 432 in a direction away from the inlet. An outer cavity 452 which is connected by the holes 438a of the socket of the outlet 438 to its inner space is present between the casing 434 and the surfaces 441a, 441b, 441c of the catalyst supports 441.

The catalytic converter 431 can be installed in an exhaust system of an internal combustion engine. During its operation, exhaust gas indicated by arrows in FIG. 15 then flows through the inlet 437 into the inner cavity 451. The exhaust gas is deflected therein and distributed over the passages 447 and then flows through the passages 447, whereupon it is catalytically treated. The exhaust gas then passes into the outer cavity 452 and flows therein to the outlet 438, it also being possible for some of the exhaust gas to flow between the side surfaces 441a, 441b of adjacent catalyst supports 441. The exhaust gas then flows through the holes 438a into the inner space of the outlet 438 and leaves the inner space of the housing 443 through said outlet.

The catalytic converter shown in FIGS. 15 to 19 has various advantages, some of which have already been described in the introduction and/or in relation to the catalytic converters shown in FIGS. 1 to 14, and combines these advantages in a particularly favorable manner. The catalytic converter 431 has, for example, only relatively small cross-sectional dimensions at right angles to the axis 432 in comparison with the quantity of exhaust gas to be treated per unit time. Furthermore, the passages 447 present in the catalyst supports 441 may have small cross-sectional areas and may be close together. Each catalyst support 441 may therefore have a large number of passages per unit area of its inner surface 441d or outer surface 441c at right angles to the passages 447, or of a curved sectional surface parallel to these surfaces, or also per unit area of a flat sectional surface at right angles to at least some passages. This in turn makes it possible to achieve high efficiency, to make the passages relatively short and to keep the volume, the weight and the noble metal requirement of the catalyst means low. Because the passages 447 are relatively short in comparison with the quantity of exhaust gas to be treated and in comparison with the axial extension of the catalyst means and with the length of the inner surfaces 441d, the pressure drop produced by the catalyst means 440 during operation can be kept small in spite of the small cross-sectional area of the passages. The cross-sectional area of the inner cavity 451, which decreases linearly in a direction away from the inlet 437, results in a uniform distribution of the exhaust gas over the various passages and helps to ensure that the exhaust gas is deflected and distributed over the various passages 447 substantially without turbulence and with a small pressure loss. Since the inlet 437 and the inner cavity 451 have a common straight axis and the exhaust gas flows essentially straight—i.e. without deflection—from the inlet into the inner cavity 451, there is only a small pressure loss between the inlet and the exhaust gas entry surfaces of the catalyst means 440, which surfaces are formed by the four inner surfaces 441d. Furthermore, there is also only a small pressure loss between the outer surfaces 441c serving as exhaust gas exit surfaces of the catalyst means and the outlet 438. The catalytic converter therefore causes altogether only a small pressure loss. Since the exhaust gas passes through the inlet, without contact with the wall of the housing, directly into the inner cavity 451 of the catalyst means 440, and since these nowhere directly make contact with the wall of the housing, the catalyst means 440 are rapidly heated to the temperature required for a catalytic treatment of the exhaust gas during a cold start. Another advantage is the fact that the inner cavity 451 contains no bounding element which corresponds to the bounding elements 250, 380, 420 and which would also have to be heated during a cold start. The catalyst means 440 are also stable and robust and can be economically produced and economically installed in a housing. The fact that the catalyst means can be installed in the metallic housing without it being necessary to arrange a particular heat-insulating and/or sound-insulating intermediate layer between the wall of the housing and the catalyst means also contributes toward economical production.

Figure 20:
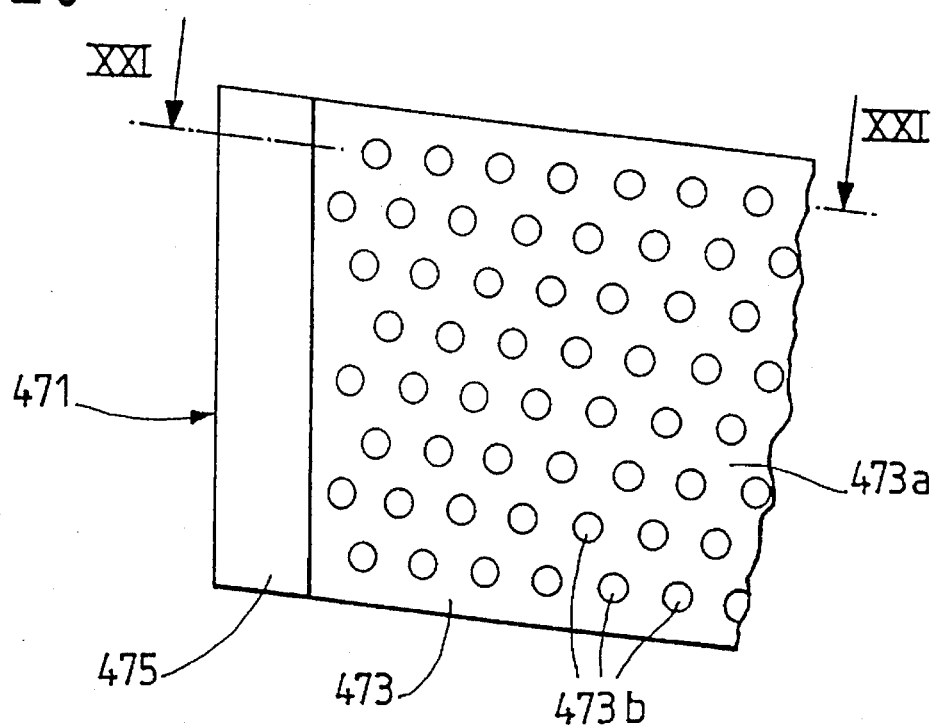
FIG. 20 shows a view of catalyst means having sheet metal members which possess bulges and FIG. 21 shows a section along the line XXI—XXI in FIG. 20, on an enlarged scale.
Figure 21:
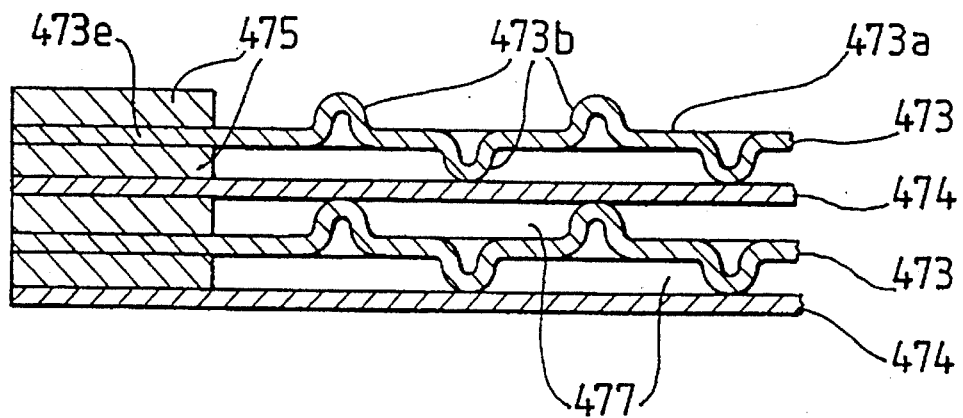

The catalyst support 471 shown partly in FIG. 20 and 21 may have, for example, a contour similar to the catalyst support 211 shown in FIG. 1 to 4 and may therefore form a prism whose base surface consists of an oblique-angled parallelogram. The catalyst support 471 has a packet of alternating first sheet metal members 473 and second sheet metal members 474 which have the same contour as the base surface of the prism. Each first sheet metal member 473 has a main section 473a with protuberances which consist of bulges 473b which are distributed uniformly above the main section 473a and at least most of which are a distance away from the edges of the sheet metal members 473 and are bounded by closed, for example circular, contour lines. In the section shown in FIG. 21, bulges 473b pointing upward and downward alternate with one another. Each first sheet metal member 473 thus has bulges 473b which project in opposite directions from a central plane of the first sheet metal member and from those regions of the first sheet metal member which are located between adjacent bulges. Each first sheet metal member 473e furthermore has, for example, two flat retaining sections 473 arranged at its shorter edges. The second sheet metal members 474 are essentially flat. The sheet metal members 473, 474 are held together by retaining means which have, for example, spacer members 475 which are welded to the sheet metal members and are arranged between the retaining sections 473e and those retaining sections of the second sheet metal members 474 which are opposite said retaining sections 473e. The catalyst support 471 has a group of passages 477 which run from one longitudinal edge to the other of the sheet metal members.

Two catalyst supports 471 formed according to FIG. 20, 21 can be arranged analogously to the catalyst supports 211 in a housing of a catalytic converter in such a way that together they form V-shaped catalyst means. However, in the case of all other catalyst supports shown in FIG. 5 to 18, there is also the possibility of providing the first sheet metal members with bulges corresponding to the bulges 473b instead of with waves.

The catalytic converters may also be modified in other respects.

For example, the first side and/or longitudinal walls 204a, 264a of the housing 203 and 263, respectively, which walls are parallel to the axis, could be replaced by side or longitudinal walls which approach one another and the axis in a direction away from the inlet.

Furthermore, features of different catalytic converters shown in the Figures can be combined with one another in a variety of ways. For example, the flat, first side and/or longitudinal walls 204a in the catalytic converter 201 shown in FIG. 1 to 3 can be replaced by side and/or longitudinal walls having a curved cross-section, as are present, for example, in the catalytic converters shown in FIG. 7 to 12.

Moreover, the passages of the catalytic converters shown in FIG. 1 to 6, 11, 12, 13 and 14 can be replaced by passages which make an angle of, preferably, at most 45° and, for example, at most 30° with planes at right angles to the axis.

The outer and inner surfaces of the catalyst supports of the catalytic converters shown in FIGS. 13 and 14 could have a flat cross-section instead of a curved one. The inner cavities 381 and 421, respectively, then have a cross-section which is essentially polygonal, i.e. triangular or quadrilateral, instead of circular. The inlet orifices leading into the inner cavities should then correspondingly have a cross-section which is triangular or quadrilateral instead of circular and should have the same cross-sectional dimensions as the inner cavities. The paraboloid bounding members 380 and 420 of these catalytic converters could then be replaced by an approximately triangular or quadrilateral bounding member so that the cross-sectional area of the free region of the inner cavity once again decreases at least approximately linearly and preferably exactly linearly with the distance from the inlet.

In the catalytic converter according to FIG. 13, the bounding member 380 could be omitted and the three catalyst supports could instead be provided with outer and inner surfaces which approach the axis and one another in a direction away from the inlet, analogously to the catalytic converters according to FIG. 7 to 9 and 15 to 19.

In the catalytic converter shown in FIG. 15, the socket forming the inlet 437 and consisting of a cylindrical pipe section could be replaced by a socket which widens conically, at least in part, toward the catalyst means. Furthermore, the outlet 438 shown in FIG. 15 could possibly be modified in such a way that its end facing the catalyst means extends only as far as the second end wall 436, analogously to the outlets shown in FIGS. 1, 2, 5, 7 and 11, and thus does not project into the inner space of the housing 433. The catalyst means 440 would then be fastened only at the inlet 437 and not at the outlet. If necessary, that end of the catalyst means 440 which faces the outlet could instead be connected to the casing 434 and/or to the second end wall 436 by means of some connecting members consisting of bolts or the like and distributed around the axis 432.

In the catalytic converters and/or catalyst means shown in FIGS. 1 to 14, the inlet and possibly the outlet could—analogously to the manner shown for the catalytic converter 431 in FIG. 15—be provided with a socket or pipe section projecting into the inner space of the housing and the catalyst means could be fastened to these pipe sections or sockets in such a way that they are a distance away from the two end walls and, for example, also from the casing of the housing.

Furthermore, it is also possible to provide more than four catalyst supports, each having a group of passages, and to distribute them around an axis analogously to the catalytic converters according to FIGS. 7 to 19, so that they together enclose an inner cavity.

The weld connections which connect the sheet metal and spacer members of the catalyst supports can be replaced by hard solder joints or possibly by clamp connections in certain variants. In order to produce clamp connections, the retaining means may then also have bolts which pass through the sheet metal and spacer members. It is even possible to provide retaining means—for example bolts and spacer rings—which intersect and/or subdivide some exhaust gas passages of the catalyst means. These passages intersected by members of the retaining means may then be slightly shorter than the other passsages.

In the catalyst means described with reference to FIGS. 1 to 19, the osculating planes defined by the sheet metal members and molding to their surfaces and also the flat sheet metal members themselves are parallel to the axis of the catalytic converters and catalyst means. However, at least in the case of the flat catalyst supports having inner and outer surfaces, the sheet metal members could be arranged in such a way that the osculating planes defined by the sheet metal members and molding to these and the flat sheet metal members themselves make an angle with the axis of the catalytic converters and catalyst means and, for example in the case of catalyst supports arranged in a V-shape according to FIGS. 1 to 3, are at right angles to the walls 204b of the housing and either at right angles to the axis 202 or at right angles to the inner surfaces 211d and the outer surfaces 211c. As in the case of the catalyst supports shown, the waves may then run parallel to the walls 204b, from the inner cavity 221 to the outer cavity 222.

What is claimed is:

1. Catalytic converter for the catalytic treatment of exhaust gas, comprising a housing and catalyst means arranged therein, an inner cavity located at least partially between regions of the catalyst means, and an outer cavity located between the catalyst means and at least a part of the housing, the catalyst means having at least two packets of sheet metal members which bound passages leading from the inner cavity to the outer cavity, wherein each of the two packets has pairs of adjacent sheet metal members, at least one sheet metal member of each pair of the adjacent sheet metal members having protuberances, wherein, sheet metal members belonging to the same packet define osculating surfaces which abut said sheet metal members and extend parallel to one another, the passages bounded by the packets leading away from the inner cavity on different sides of the inner cavity, wherein the housing further comprises an inlet having an inner space and an orifice leading into the inner cavity, and an outlet having an inner space connected to the outer cavity, the inner space of the inlet having, at the orifice, essentially a same cross-sectional shape and essentially same cross-sectional dimensions as the inner cavity at the orifice, and wherein the inner cavity has at least one free region which borders the catalyst means and cross-sectional area of which decreases, in a direction away from the inlet, essentially along an entire dimension of the free region, which is taken in the direction away from the inlet, essentially linearly.

2. Catalytic converter according to claim 1, wherein the passages have ends which lead into the outer cavity, the various packets of sheet metal members are spaced a distance from each other, which is substantially greater than a distance between adjacent sheet metal members belonging to one and the same packet at least at the ends of the passages.

3. Catalytic converter according to claim 1, wherein the adjacent sheet metal members belonging to the same packet touch one another in osculating planes.

4. Catalytic converter according to claim 1, wherein each packet has alternate first sheet metal members having protuberances and second, flat sheet metal members.

5. Catalytic converter according to claim 4, wherein the protuberances are formed by waves, and the waves belonging to one and the same sheet metal member, are parallel to one another and extend from the inner cavity to the outer cavity.

6. Catalytic converter according to claim 1, wherein each sheet metal member has two straight edges parallel to one another in a projection which is at right angles to an osculating surface abutting the relevant sheet metal member, and wherein one of the two edges is adjacent to the inner cavity, and another of the two edges is adjacent to the outer cavity.

7. Catalytic converter according to claim 6, wherein each sheet metal member in the said projection is quadrilateral and also has two other, straight edges parallel to one another and extending from the inner cavity to the outer cavity.

8. Catalytic converter according to claim 7, wherein the sheet metal members belonging to the same packet are firmly connected at their edges extending either directly or indirectly from the inner cavity to the outer cavity.

9. Catalytic converter according to claim 1, wherein the packets have inner surfaces which border the inner cavity and together enclose the inner cavity essentially completely and without gaps in cross-section.

10. Catalytic converter according to claim 1, wherein each packet of sheet metal members has flat inner surface bordering the inner cavity and a flat outer surface parallel to said inner surface and bordering the outer cavity, wherein each inner surface and each outer surface form a right-angled parallellogram, and wherein the passages have orifices in the inner surface and in the outer surface.

11. Catalytic converter according to claim 1, wherein the catalyst means have at least three packets of sheet metal members, which packets border the inner cavity.

12. Catalytic converter according to claim 1, wherein each of the packets has an essentially prismatic shape, and wherein the inner space of the inlet and the inner cavity form a polygon in cross-section at the orifice of the inner space of the inlet which leads into said inner space.

13. Catalytic converter according to claim 12, wherein the inner space of the inlet has a cylindrical section and a section which forms said orifice of the inlet and said polygon in cross-section.

14. Catalytic converter according to claim 13, wherein the housing and the inlet define an axis and wherein said section of the inlet forming a polygon in cross-section has inner surfaces which are inclined against the axis in an axial direction.

15. Catalytic converter according to claim 1, wherein the inner space of the inlet and the inner cavity are circular in cross-section at the orifice of the inlet.

16. Catalytic converter according to claim 1, wherein the packets have inner surfaces which border the inner cavity and approach one another in a direction away from the inlet.

17. Catalytic converter according to claim 1, wherein the catalyst means define an axis, wherein the packets have inner surfaces which are parallel to said axis and border the inner cavity, wherein a bounding member is arranged in the inner cavity and, together with the inner surfaces opposite to it, bounds at least one free region of the inner cavity, and wherein the bounding member approaches the inner surface in a direction away from the inlet.

18. Catalytic converter according to claim 1, wherein the sheet metal members have coatings containing catalytically active material, and wherein each sheet metal member has at least one flat retaining section which rests against at least one of a flat retaining section of another sheet metal member and of a member of retaining means, and wherein the retaining sections and members resting against one another are connected to one another.

19. Catalytic converter according to claim 1, wherein each of said packets has an essentially prismatic contour shape, and wherein the inner space of the inlet and the inner cavity are substantially quadrilateral in cross-section at said orifice.

20. Catalytic converter for the catalytic treatment of exhaust gas, comprising a housing and catalyst means arranged therein, an inner cavity located at least partially between regions of the catalyst means, an outer cavity located between the catalyst means and at least a part of the housing, an inlet having an inner space and an orifice leading into the inner cavity, and an outlet having an inner space connected to the outer cavity, the catalyst means having at least two packets of sheet metal members which bound passages leading from the inner cavity to the outer cavity, wherein each of said packets has pairs of adjacent sheet metal members, at least one sheet metal member of each pair of adjacent sheet metal members having protuberances, wherein the sheet metal members belonging to the same packet define osculating surfaces which abut the sheet metal members and are parallel to one another, wherein the passages bounded by the various packets extend from the inner cavity on different sides of said inner cavity, wherein each sheet metal member is substantially quadrilateral in a projection perpendicular to the osculating surface abutting said sheet metal member and has an inner edge adjacent to said inner cavity and an outer edge which is adjacent to said outer cavity, and wherein the inner edge and the outer edge of one of the same sheet metal member are straight and parallel to one another in said projection.

21. Catalytic converter according to claim 20, wherein each sheet metal member forms, in said projection, a parallelogram and wherein all sheet metal members belonging to one and the same packet have the same contour shape and the same dimensions in said projection.

22. Catalytic converter according to claim 20, wherein each packet has alternate first sheet metal members provided with waves and second, flat sheet metal members, wherein the waves extend from the inner cavity to the outer cavity and wherein the sheet metal members comprise coatings containing catalytically active material.

23. Catalytic converter according to claim 20, wherein each packet has a substantially prismatic contour shape and wherein the inner edges of the sheet metal members belonging to the same packet define an inner surface forming substantially a right-angled parallelogram.

24. Catalytic converter according to claim 20, further comprising an axis, wherein the inner edges of the sheet metal members extend generally along the axis, wherein the inner edges of each packet form an inner surface of said packet, wherein the inner surfaces of the various packets together substantially completely enclose the axis.

25. Catalytic converter according to claim 24, wherein the surface formed by the inner surfaces of the various packets is substantially circular in cross-section at least at an end of the inner cavity which is adjacent to said orifice of the inlet.

26. Catalytic converter according to claim 24, wherein the inner surfaces are parallel to the axis, and wherein the inner cavity contains a bounding member and a free region disposed between the inner surfaces and the bounding member, and wherein the bounding member approaches the inner surfaces in a direction away from the inlet so that a cross-sectional area of the free region decreases substantially linearly in a direction away from the inlet.

27. Catalytic converter according to claim 24, wherein the inner surface of each packet has two edges extending generally along the axis and wherein the inner edges of sheet metal members disposed between said edges of the inner surfaces of the packets are inclined inwards in a direction away from the inlet in such a way that a cross-sectional area of the inner cavity decreases substantially linearly in said direction.

28. Catalytic converter for the catalytic treatment of exhaust gas, comprising a housing and two catalyst supports arranged therein, an inner cavity located between the two catalyst supports, an outer cavity located between the catalyst supports and at least a part of the housing, an inlet having an inner space and an orifice leading into the inner cavity, and an outlet having an inner space connected to the outer cavity, each of the two catalyst supports having a packet of alternate first, corrugated sheet metal members and second, flat sheet metal members, the sheet metal members bounding passages leading from the inner cavity to the outer cavity, wherein all flat sheet metal members belonging to the same packet have surfaces which are parallel to one another, and wherein each catalyst support has a substantially right-angled parallelogram and is adjacent to the inner cavity, the inner surfaces of the two catalyst supports being opposite to one another and approaching each other in a direction away from the inlet, so that a cross-sectional area of the inner cavity decreases in a direction away from the inlet essentially along its entire dimension extending in said direction essentially linearly with the distance from the inlet and wherein the inner space of the inlet has, at said orifice, essentially the same quadrilateral cross-sectional shape and essentially the same cross-sectional dimensions as the inner cavity at the orifice.

29. Catalytic converter according to claim 28, wherein each sheet metal member has an edge adjacent to the inner cavity, and edge adjacent to the outer cavity and two edges extending from the inner cavity to the outer cavity, and wherein the sheet metal members belonging to the same packet are firmly connected either directly or indirectly at the edges extending from the inner cavity to the outer cavity.

30. Catalytic converter according to claim 28, wherein the housing comprises two walls which are opposite to one another, are substantially flat, and are parallel to one another, and wherein each catalyst support comprises two opposite surfaces which rest against one of said walls.

31. Catalytic converter according to claim 28, wherein the inner space of the inlet has a cylindrical section and a section which forms said orifice and is quadrilateral in cross-section at the orifice, wherein the housing and the inlet define an axis, and wherein the inlet has inner surfaces which border the orifice forming section of the inner space of the inlet and which are inclined in a section along the axis.

32. Catalytic converter for the catalytic treatment of exhaust gas, comprising a housing and at least two catalyst supports arranged therein, an inner cavity located between the catalyst supports and an outer cavity located between the catalyst supports and at least a part of the housing, an inlet having an inner space and an orifice leading into the inner cavity, and outlet having an inner space connected to the outer cavity, a bounding member located at least partly in the inner cavity and an axis, each catalyst support having a packet of alternate first, corrugated sheet metal members and second, flat sheet metal members, the sheet metal members bounding passages leading from the inner cavity to the outer cavity, wherein the passages located within the various catalyst supports extend from the inner cavity on different sides of the inner cavity, wherein each catalyst support has an inner surface which is adjacent to an inner free region of the inner cavity, wherein the bounding member approaches the inner surfaces so that said free region has a cross-sectional area which decreases in a direction away from the inlet substantially along its entire axial dimension essentially linearly with the distance from the inlet, and wherein the inner space of the inlet has, at said orifice, essentially the same cross-sectional shape and essentially the same cross-sectional dimensions as the inner cavity.

33. Catalytic converter according to claim 32, wherein said inner surfaces of the catalyst supports are substantially planar, and wherein said inner cavity and said orifice are substantially polygon-shaped in cross-section.

34. Catalytic converter according to claim 32, wherein the inner surfaces of the various catalyst supports form together a substantially cylindrical surface, and wherein said cylindrical surface and the orifice are substantially circular in cross-section.

35. Catalytic converter for the catalytic treatment of exhaust gas, comprising a housing and at least two catalyst supports arranged therein, an inner cavity located between the catalyst supports, an outer cavity located between the catalyst supports and at least a part of the housing, an inlet having an inner space and an orifice leading into the inner cavity, an outlet having an inner space connected to the outer cavity and an axis, each of the catalyst supports having a packet of alternate first, corrugated sheet metal members and second, flat sheet metal members, the sheet metal members having inner edges which are adjacent to the inner cavity and which are straight in a projection perpendicular to the flat sheet metal members and extend generally along the axis, the sheet metal members bounding passages leading from the inner cavity to the outer cavity, wherein the passages located within the various catalyst supports extend from the inner cavity on different sides of the latter, wherein the inner edges of the sheet metal members of each packet form an inner surface of said packet, wherein the inner surfaces of the various packets together substantially completely enclose the axis, wherein the inner surface of each packet has two edges extending generally along the axis, and wherein the inner edges of sheet metal disposed between said edges of the inner surfaces are inclined inwards in a direction away from the inlet in such a way that a cross-sectional area of the inner cavity decreases substantially linearly in said direction.

36. Catalytic converter according to claim 35, wherein the inner space of the inlet and the inner cavity have substantially same cross-sectional dimensions of said orifice of the inlet.

37. Catalytic converter according to claim 35, wherein the inner space of the inlet and the inner cavity are substantially circular in cross-section at said orifice.

38. Catalytic converter according to claim 35, wherein said edges of the inner surface are in general parallel to the axis.

* * * * *